(12) United States Patent
Yen et al.

(10) Patent No.: US 12,736,754 B2
(45) Date of Patent: Sep. 15, 2026

(54) OPTICAL FIBER TRANSMISSION DEVICE AND MANUFACTURING METHOD THEREOF

(71) Applicant: AuthenX Inc., Hsinchu County (TW)

(72) Inventors: Chun-Chiang Yen, Hsinchu County (TW); Po-Kuan Shen, Hsinchu County (TW); Sheng-Fu Lin, Hsinchu County (TW); Yi-Ting Lu, Hsinchu County (TW); Jun-Rong Chen, Hsinchu County (TW); Jenq-Yang Chang, Hsinchu County (TW); Mao-Jen Wu, Hsinchu County (TW)

(73) Assignee: AuthenX Inc., Hsinchu County (TW)

( * ) Notice: Subject to any disclaimer, the term of this patent is extended or adjusted under 35 U.S.C. 154(b) by 411 days.

(21) Appl. No.: 18/467,423

(22) Filed: Sep. 14, 2023

(65) Prior Publication Data

US 2024/0085634 A1 Mar. 14, 2024

Related U.S. Application Data

(63) Continuation-in-part of application No. 18/304,375, filed on Apr. 21, 2023.

(60) Provisional application No. 63/406,669, filed on Sep. 14, 2022.

(51) Int. Cl.
*G02B 6/36* (2006.01)

(52) U.S. Cl.
CPC .................................. *G02B 6/3624* (2013.01)

(58) Field of Classification Search
CPC ..... G02B 6/4239; G02B 6/424; G02B 6/3624
See application file for complete search history.

(56) References Cited

U.S. PATENT DOCUMENTS

| | | | | |
|---|---|---|---|---|
| 10,436,990 | B2 | 10/2019 | Bruck et al. | |
| 10,627,575 | B2 | 4/2020 | Bruck et al. | |
| 10,866,376 | B1 * | 12/2020 | Ghiasi | G02B 6/4284 |
| 11,119,280 | B2 | 9/2021 | Chern et al. | |
| 11,313,682 | B1 | 4/2022 | Hung | |
| 11,428,870 | B2 | 8/2022 | Kuo et al. | |
| 11,531,173 | B2 | 12/2022 | Chern et al. | |
| 2003/0034438 | A1 * | 2/2003 | Sherrer | G02B 6/4257 250/216 |
| 2010/0119229 | A1 | 5/2010 | Roelkens et al. | |
| 2010/0178053 | A1 | 7/2010 | Sagawa et al. | |
| 2012/0251122 | A1 | 10/2012 | Grobe et al. | |
| 2016/0047990 | A1 | 2/2016 | Zine-El-Abidine | |
| 2022/0405566 | A1 | 12/2022 | Winterbottom et al. | |

* cited by examiner

*Primary Examiner* — Michael P Mooney

(57) ABSTRACT

An optical fiber transmission device includes a substrate, a photonic integrated circuit, and an optical fiber assembly. The photonic integrated circuit is disposed on an area of the substrate. The substrate has a protruding structure at an interface with an edge of the photonic integrated circuit. The optical fiber assembly includes an optical fiber and a ferrule that sleeves the optical fiber. The protruding structure of the substrate is configured to abut against the ferrule to limit the position of the optical fiber assembly in a vertical direction of the substrate, such that the protruding structure is a stopper for the optical fiber assembly in the vertical direction.

19 Claims, 22 Drawing Sheets

C
144c
142
132
134
130
Z
X
Y

OPTICAL FIBER TRANSMISSION DEVICE AND MANUFACTURING METHOD THEREOF

CROSS-REFERENCE TO RELATED APPLICATIONS

This application is a Continuation-in-part of U.S. application Ser. No. 18/304,375, filed Apr. 21, 2023, which claims priority of U.S. Provisional Application Ser. No. 63/406,669, filed on Sep. 14, 2022, which are herein incorporated by reference in their entirety.

BACKGROUND

Field of Disclosure

The present disclosure relates to an optical fiber transmission device and a manufacturing method thereof.

Description of Related Art

Existing optical fiber transmission devices have a large quantity of positioning structures, such as screws, sleeves, package covers, ferrules, etc., which are used to fix a position of an optical fiber relative to a photonic integrated circuit, so as to align the optical fiber with the photonic integrated circuit (photonic integrated circuit, PIC) to transmit an optical signal.

In addition, in order to improve coupling efficiency of the optical fiber transmission device receiving and transmitting an optical signal, although the optical fiber may be disposed obliquely relative to the photonic integrated circuit, configuration and assembly of the positioning structure are more difficult, and it is difficult to reduce manufacturing costs of the optical fiber transmission device. Because there are still many disadvantages, it is necessary for practitioners in this field to develop an optical fiber positioning structure and assembly method suitable for an optical fiber transmission device.

SUMMARY

According to some embodiments of the present disclosure, an optical fiber transmission device includes a substrate, a photonic integrated circuit, and an optical fiber assembly. The photonic integrated circuit is disposed on an area of the substrate. The substrate has a protruding structure at an interface with an edge of the photonic integrated circuit. The optical fiber assembly includes an optical fiber and a ferrule that sleeves the optical fiber. The protruding structure of the substrate is configured to abut against the ferrule to limit a position of the optical fiber assembly in a vertical direction of the substrate, such that the protruding structure is a stopper for the optical fiber assembly in the vertical direction of the substrate.

According to some embodiments of the present disclosure, a manufacturing method of an optical fiber transmission device includes: forming a protruding structure on a substrate; disposing a photonic integrated circuit on an area of the substrate, wherein the protruding structure is located at an interface between the substrate and an edge of the photonic integrated circuit; sleeving an optical fiber by a ferrule of the optical fiber to form an optical fiber assembly; grinding one end of the optical fiber assembly that faces the photonic integrated circuit, so that a ground end face is formed on the optical fiber assembly, and the ground end face is parallel to a horizontal plane of the photonic integrated circuit; optically aligning the optical fiber with the photonic integrated circuit; and configuring the protruding structure of the substrate to abut against the ferrule to limit a position of the optical fiber assembly in a vertical direction of the substrate to serve as a stopper for the optical fiber assembly in the vertical direction.

According to some embodiments of the present disclosure, a manufacturing method of an optical fiber transmission device includes: forming a protruding structure on a substrate; disposing a photonic integrated circuit on an area of the substrate, wherein the protruding structure is located at an interface with an edge of the photonic integrated circuit; positioning an optical fiber assembly in at least one fixing member, wherein the optical fiber assembly includes an optical fiber and a ferrule that sleeves the optical fiber; synchronously grinding the fixing member and one end of the optical fiber assembly that faces the photonic integrated circuit, so that each of the fixing member and the optical fiber assembly forms a ground end face, wherein the ground end face is parallel to a horizontal plane of the photonic integrated circuit; optically aligning the optical fiber with the photonic integrated circuit; and disposing the fixing member on the substrate to configure the protruding structure of the substrate to abut against the ferrule to limit a position of the optical fiber assembly in a vertical direction of the substrate to serve as a stopper for the optical fiber assembly in the vertical direction.

In the above-mentioned embodiments of the present disclosure, because the substrate has a protruding structure at an interface with an edge of the photonic integrated circuit, the protruding structure of the substrate may abut against the ferrule of the optical fiber assembly, so that one end of the optical fiber assembly that faces the photonic integrated circuit may be determined based on a height of the protruding structure. That is, the protruding structure may limit a position in the vertical direction of the substrate to serve as a stopper. In addition, when manufacturing the optical fiber transmission device, the optical fiber assembly may be positioned in the fixing member first, and then one end of the optical fiber assembly is ground and the fixing member is selectively ground synchronously, so that the optical fiber assembly (or the optical fiber assembly and the fixing member) has a ground end face parallel to the horizontal plane of the photonic integrated circuit. In this way, an inclined design of the optical fiber relative to the photonic integrated circuit can be realized, coupling efficiency of the optical fiber transmission device receiving and transmitting an optical signal can be improved, a quantity and complexity of a positioning structure of the optical fiber can be effectively simplified, material costs and assembly time can be reduced, and product competitiveness of the optical fiber transmission device can be improved.

BRIEF DESCRIPTION OF THE DRAWINGS

Aspects of the present disclosure may be best understood from the following detailed description when read with the accompanying drawings. It is noted that, in accordance with the standard practice in the industry, various features are not drawn to scale. In fact, dimensions of the various features may be arbitrarily increased or reduced for clarity of discussion.

DETAILED DESCRIPTION

Figure 1:
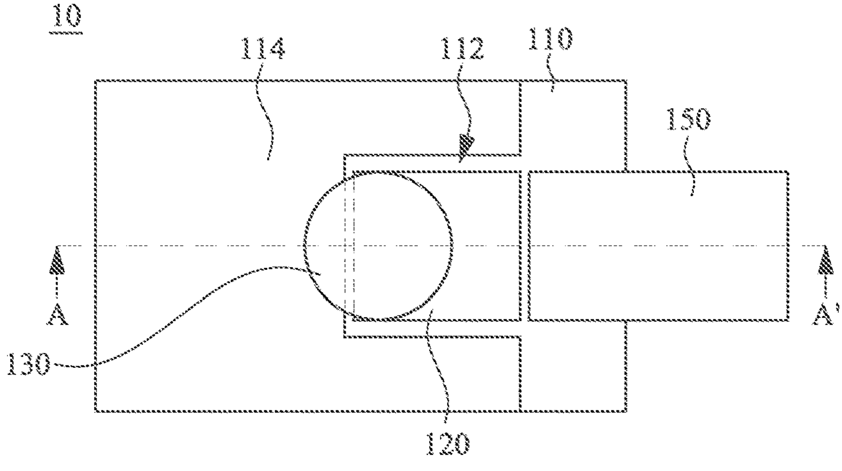
FIG. 1 shows a top view of a substrate, a photonic integrated circuit and a flexible circuit board according to an embodiment of the present disclosure.

Embodiments disclosed below provide many different embodiments or examples for implementing different features of the provided subject matter. Further, specific examples of components and arrangements are described below to simplify the present disclosure. These are, of course, merely examples and are not intended to be limiting. In addition, reference numerals and/or letters may be repeated in the various examples in the disclosure. This repetition is for the purpose of simplicity and clarity and does not in itself dictate a relationship between the various discussed embodiments and/or configurations.

Spatially relative terms, such as "beneath," "below," "lower," "above," "upper" and the like, may be used here for convenience of description to describe one element or feature's relationship to another element(s) or feature(s) as illustrated in the figures. The spatially relative terms are intended to encompass different orientations of the device in use or operation in addition to the orientation illustrated in the figures. The device may be otherwise oriented (rotated 90 degrees or at other orientations) and the spatially relative descriptors used herein may likewise be interpreted accordingly.

FIG. 1 shows a top view of a substrate 110, a photonic integrated circuit (Photonic integrated circuit, PIC) 120 and a flexible printed circuit (Flexible printed circuit, FPC) board 150 according to an embodiment of the present disclosure. An optical fiber transmission device 10 includes the substrate 110, the photonic integrated circuit 120, and an optical fiber assembly 130. The photonic integrated circuit 120 is disposed on an area 112 of the substrate 110. The substrate 110 has a protruding structure 114 disposed at an interface with an edge of the photonic integrated circuit 120. The flexible circuit board 150 is located on one side of the substrate 110 and adjacent to the photonic integrated circuit 120. The photonic integrated circuit 120 has a light source and may be electrically connected to the flexible circuit board 150 through wire bond.

Figure 2:
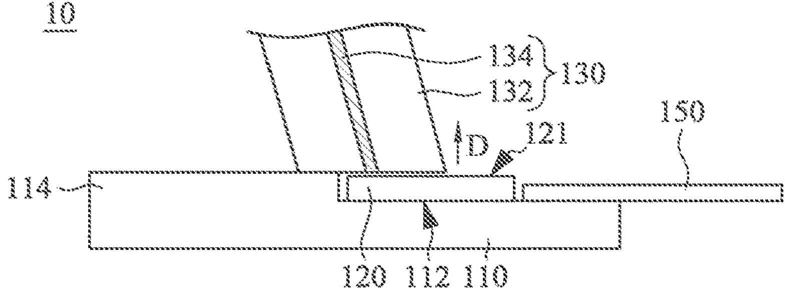
FIG. 2 shows a cross-sectional view of the substrate and the photonic integrated circuit of FIG. 1 along a line A-A'.
Figure 3:
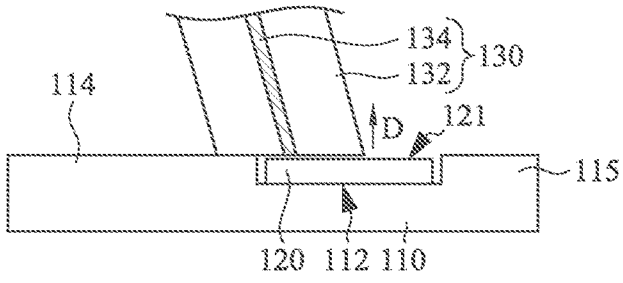
FIGS. 3 and 4 show cross-sectional views of a substrate and a photonic integrated circuit according to some embodiments of the present disclosure.
Figure 4:
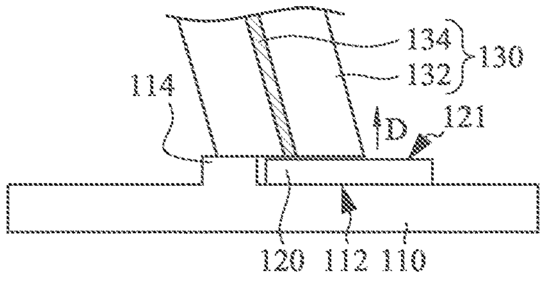

FIGS. 2 to 4 show cross-sectional views of the substrate 110 and the photonic integrated circuit 120 according to some embodiments of the present disclosure. As shown in FIGS. 2 to 4, the substrate 110 has a protruding structure 114 at an interface with an edge of the photonic integrated circuit 120. The photonic integrated circuit 120 is disposed on the substrate 110, and the optical fiber assembly 130 located above the photonic integrated circuit 120 may be optically coupled with the photonic integrated circuit 120. The optical fiber assembly 130 includes a ferrule 132 and an optical fiber 134, and the ferrule 132 sleeves the optical fiber 134. During assembly, the protruding structure 114 of the substrate 110 may abut against the ferrule 132 to limit a position of the optical fiber assembly 130 in a vertical direction D of the substrate 110. In other words, the protruding structure 114 may serve as a stopper of the optical fiber assembly 130 in the vertical direction D of the substrate 110.

FIG. 2 shows a cross-sectional view of the substrate 110 and the photonic integrated circuit 120 along a line A-A' as shown in FIG. 1. In the embodiment of FIG. 2, the area 112 of the substrate 110 in which the photonic integrated circuit 120 is disposed may be a plane lower than a top surface of the protruding structure 114, and the photonic integrated circuit 120 overlaps with a part of the area 112. In the embodiment of FIG. 3, the area 112 of the substrate 110 in which the photonic integrated circuit 120 is located may be a groove, and the photonic integrated circuit 120 is located in this groove. Thicknesses of protruding structures 114 and 115 defines a depth of the groove. In addition, the embodiment of FIG. 4 is different from the embodiment of FIG. 3 in that a width of the protruding structure 114 of FIG. 4 is smaller, but the protruding structure 114 can still be used as a stopper of the optical fiber assembly 130 in the vertical direction D of the substrate 110. The protruding structure 114 of the substrate 110 may be disposed along at least one side of the photonic integrated circuit 120 (for example, along the other three sides of the photonic integrated circuit 120 that do not face the flexible circuit board 150), depending on a design requirement.

The extending direction of the optical fiber 134 in FIGS. 2 to 4 is substantially perpendicular to the horizontal plane 121 (e.g., a top surface) of the photonic integrated circuit 120. In order to improve coupling efficiency of the optical fiber 134 and the photonic integrated circuit 120 receiving and transmitting an optical signal, in the following description, an optical fiber transmission device in which the optical fiber 134 is disposed obliquely relative to the photonic integrated circuit 120 and a manufacturing method thereof will be described. In addition, partial enlarged views of the photonic integrated circuit 120 and the substrate 110 shown in FIGS. 5A to 13E may be shown in FIGS. 2 to 4. For simplicity, gaps between the photonic integrated circuit 120, the substrate 110 and the optical fiber assembly 130 are omitted in FIGS. 5A to 13E.

Figure 5A:
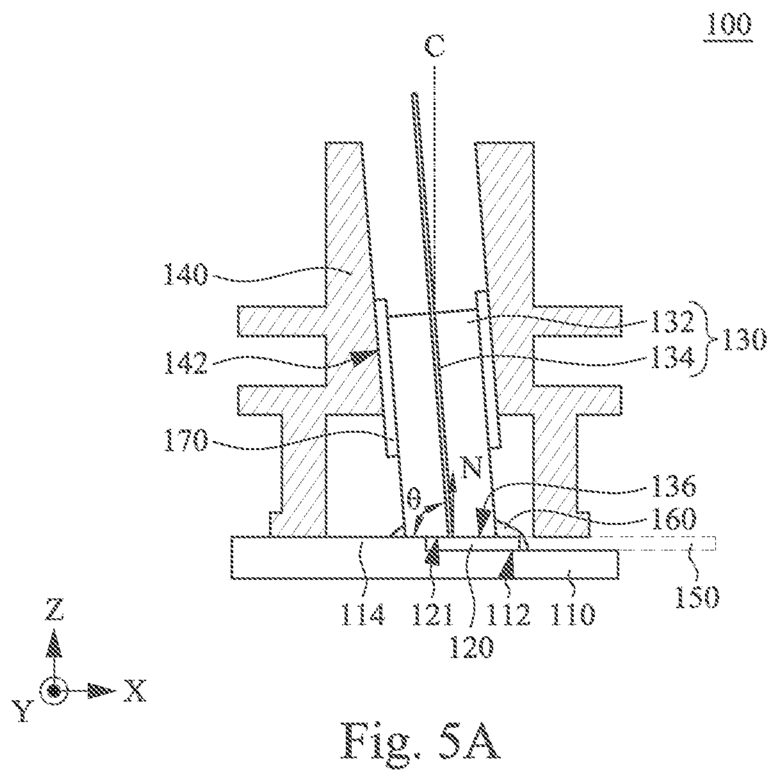
FIG. 5A shows a cross-sectional view of an optical fiber transmission device according to an embodiment of the present disclosure.

FIG. 5A shows a cross-sectional view of an optical fiber transmission device 100 according to an embodiment of the present disclosure. The optical fiber transmission device 100 includes the substrate 110 having a protruding structure 114, the photonic integrated circuit 120 located on the substrate 110, the optical fiber assembly 130 optically coupled to the photonic integrated circuit 120 and located on the protruding structure 114, and at least one fixing member 140 for positioning the optical fiber assembly 130. The fixing member 140 is disposed on the substrate 110 and sleeves the optical fiber assembly 130. In other words, the optical fiber assembly 130 is surrounded by the fixing member 140. The optical fiber assembly 130 is optically coupled with the photonic integrated circuit 120 in the extending direction of the optical fiber assembly 130, and the extending direction forms an acute angle θ with the horizontal plane 121 of the photonic integrated circuit 120. In other words, the extending direction of the optical fiber assembly 130 is disposed obliquely relative to the normal direction N of the horizontal plane 121 of the photonic integrated circuit 120. It should be noted that, based on an alignment position of optical coupling of the optical fiber assembly 130 and the photonic integrated circuit 120, the fixing member 140 may be partially disposed on the protruding structure 114 on the substrate 110, partially disposed on a flexible circuit board 150 (as shown in FIGS. 5A to 9E), or disposed on protruding structures 114 and 115 (as shown in FIGS. 10A to 13E) on the substrate 110. This may be designed based on an actual requirement and is not limited according to the embodiment. The fixing member 140 may adjust an inclination of the optical fiber assembly 130 relative to the normal direction N of the horizontal plane 121 of the photonic integrated circuit 120. In the embodiment, the fixing member 140 has an inclined inner side wall 142, so that after the optical fiber assembly 130 is sleeved, the extending direction of the optical fiber assembly 130 may be inclined relative to the central axis C of the fixing member 140. In the description, the central axis C of the fixing member 140 is with respect to an outer contour shape of the fixing member 140.

In the embodiment, one end of the optical fiber assembly 130 that faces the photonic integrated circuit 120 has a ground end face 136. The ground end face 136 of the optical fiber assembly 130 is a continuous surface defined by a bottom surface of an optical fiber 134 and a bottom surface of a ferrule 132, and the ground end face 136 is parallel to the horizontal plane 121 of the photonic integrated circuit 120.

The optical fiber transmission device 100 may further include an optical clear adhesive 160. The optical clear adhesive 160 may bond the optical fiber assembly 130 and the photonic integrated circuit 120, and fill the gaps between the optical fiber assembly 130, the photonic integrated circuit 120 and the substrate 110 (such as the gaps in FIGS. 2 to 4) to provide a sealing effect. The light transmittance of the optical clear adhesive 160 is greater than 50%, which facilitates optical transmission between the optical fiber 134 and the photonic integrated circuit 120.

The optical fiber transmission device 100 may optionally include an adhesive 170. The adhesive 170 is located between the inner side wall 142 of the fixing member 140 and the ferrule 132 of the optical fiber assembly 130, and can fix the optical fiber assembly 130 in a bonding manner. The adhesive 170 is not limited to an optical clear adhesive. In some embodiments, the adhesive 170 can be replaced by a fixed ring. In some embodiments, the adhesive 170 may be omitted, so that the fixing member 140 fixes the optical fiber assembly 130 in a clamping manner, for example, the inner side wall 142 of the fixing member 140 directly contacts the ferrule 132 of the optical fiber assembly 130.

Figure 5B:
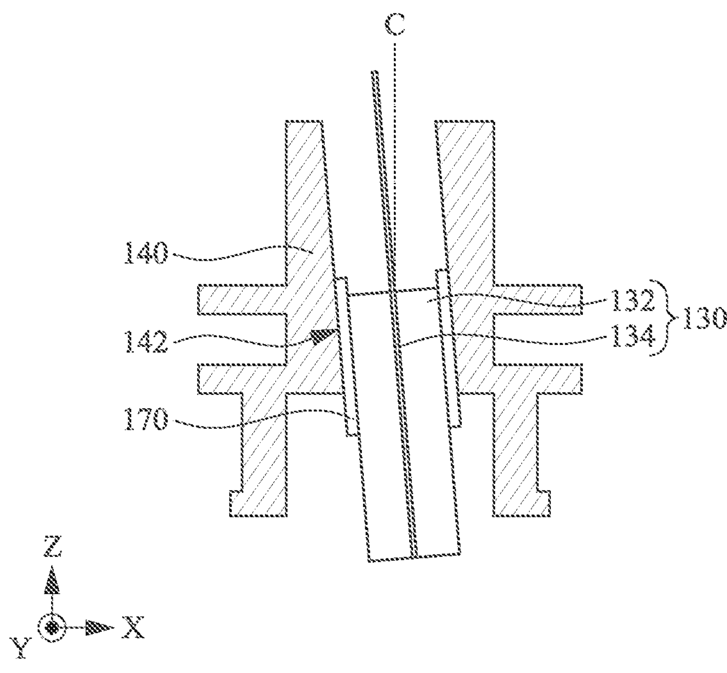
FIGS. 5B to 5D show cross-sectional views of an intermediate stage of a manufacturing method of the optical fiber transmission device of FIG. 5A.
Figure 5C:
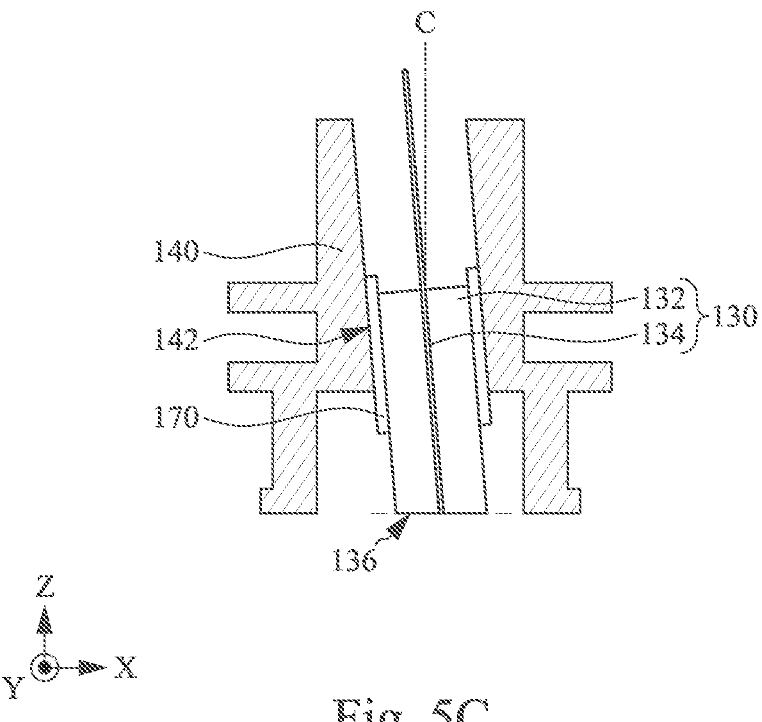
Figure 5D:
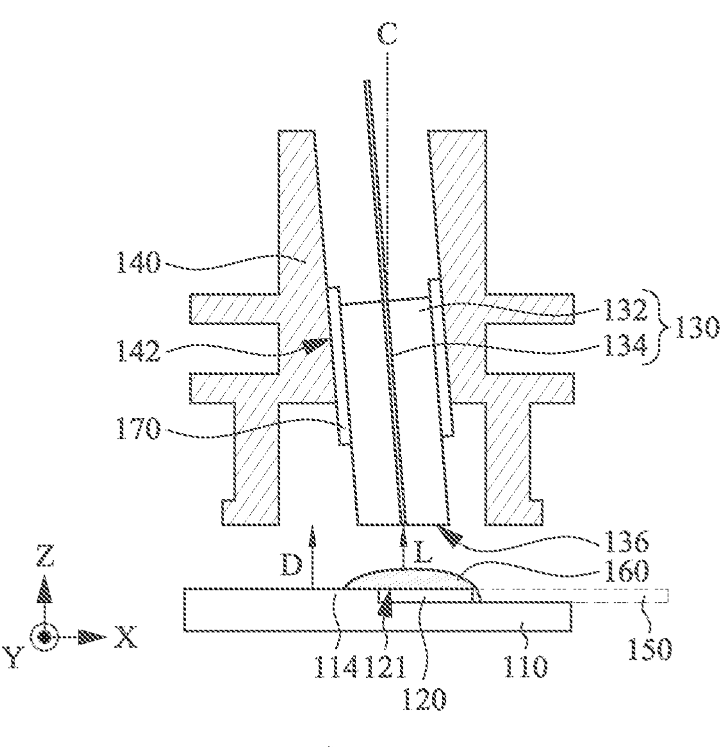

FIGS. 5B to 5D show cross-sectional views of an intermediate stage of a manufacturing method of the optical fiber transmission device 100 of FIG. 5A. Referring to FIG. 5A (or FIG. 2), the protruding structure 114 may be formed on the substrate 110, and then, the photonic integrated circuit 120 is disposed on the area 112 of the substrate 110, wherein the protruding structure 114 is located at an interface between the substrate 110 and an edge of the photonic integrated circuit 120. In addition, the flexible circuit board 150 may be disposed on the substrate 110, and the photonic integrated circuit 120 may be electrically connected to the flexible circuit board 150.

Referring to FIG. 5B, the optical fiber 134 is sleeved by the ferrule 132 to form the optical fiber assembly 130. The inclined inner side wall 142 is formed in the fixing member 140, and then, the optical fiber assembly 130 is positioned in the fixing member 140 by using the fixing member 140, for example, by fixing with the adhesive 170 or directly clamping with the inner side wall 142 of the fixing member 140. The optical fiber assembly 130 includes the optical fiber 134 and the ferrule 132 that sleeves the optical fiber 134. Because the fixing member 140 has the inclined inner side wall 142, after the optical fiber assembly 130 is positioned in the fixing member 140, the extending direction of the optical fiber assembly 130 is inclined relative to the central axis C of the fixing member 140. After this step, a bottom surface of the optical fiber assembly 130 is not horizontal, for example, the optical fiber assembly 130 protrudes downward from the fixing member 140.

Referring to FIG. 5C, then, a bottom end (i.e., one end facing the photonic integrated circuit 120 shown in FIG. 5D) of the optical fiber assembly 130 may be ground, so that the optical fiber assembly 130 forms the ground end face 136. After this step, the bottom surface (i.e., the ground end face 136) of the optical fiber assembly 130 is horizontal. Referring to FIG. 5D, the ground end face 136 of the optical fiber assembly 130 is parallel to the horizontal plane 121 of the photonic integrated circuit 120, and optical alignment (Optical alignment) is performed on the optical fiber 134 and the photonic integrated circuit 120, so that light L emitted by the photonic integrated circuit 120 is optically coupled with the optical fiber 134. In addition, before the fixing member 140 is disposed on the substrate 110, the optical clear adhesive 160 may be used to cover the photonic integrated circuit 120 and its adjacent substrate 110 to increase sealing performance. Thereafter, the fixing member 140 may be disposed on the substrate 110, so that the protruding structure 114 of the substrate 110 may abut against the ferrule 132 to limit a position of the optical fiber assembly 130 in a vertical direction D (i.e., a Z-axis direction) of the substrate 110, to serve as a stopper for the optical fiber assembly 130 in the vertical direction D. The optical clear adhesive 160 may bond the optical fiber assembly 130. In addition, the fixing member 140 may be fixed on the substrate 110 through laser welding (Laser welding), to facilitate rapid positioning and improve accuracy of optical alignment. In other embodiments, the fixing member 140 may alternatively be fixed to the substrate 110 by using the adhesive. Through the above steps, the optical fiber transmission device 100 shown in FIG. 5A may be obtained.

Specifically, because the substrate 110 has the protruding structure 114 at the interface with the edge of the photonic integrated circuit 120, when the fixing member 140 is disposed on the substrate 110, one end of the optical fiber assembly 130 that faces the photonic integrated circuit 120 may be determined based on a height of the protruding structure 114. In addition, when the optical fiber transmission device 100 is manufactured, the optical fiber assembly 130 may be positioned in the fixing member 140 first, and then, one end of the optical fiber assembly 130 may be ground, so that the optical fiber assembly 130 has the ground end face 136 parallel to the horizontal plane 121 of the photonic integrated circuit 120. In this way, an inclined design of the optical fiber 134 relative to the photonic integrated circuit 120 can be realized, coupling efficiency of the optical fiber transmission device 100 receiving and transmitting an optical signal can be improved, a quantity and complexity of a positioning structure of the optical fiber 134 can be effectively simplified, material costs and assembly time can be reduced, and product competitiveness of the optical fiber transmission device can be improved.

It should be understood that a connection relationship, a material and a function of the components that have been described will not be repeated. In the following description, other types of optical fiber transmission devices and manufacturing methods thereof will be described.

Figure 6A:
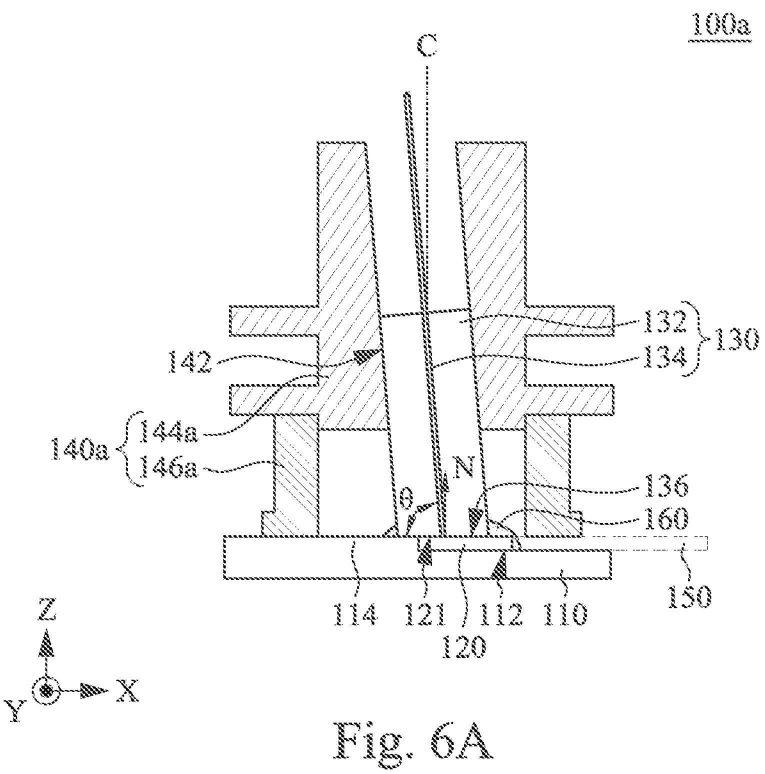
FIG. 6A shows a cross-sectional view of an optical fiber transmission device according to another embodiment of the present disclosure.

FIG. 6A shows a cross-sectional view of an optical fiber transmission device 100*a* according to another embodiment of the present disclosure. The optical fiber transmission device 100*a* includes the substrate 110, the photonic integrated circuit 120, the optical fiber assembly 130, and a fixing member 140*a*. This embodiment is different from the embodiment of FIG. 5A in that the fixing member 140*a* includes a first sub-fixing member 144*a* and a second sub-fixing member 146*a*, wherein the second sub-fixing member 146*a* is disposed on the substrate 110 and configured to support the first sub-fixing member 144*a*. In this embodiment, the first sub-fixing member 144*a* has an inclined inner side wall 142, so that after the optical fiber assembly 130 is sleeved, the extending direction of the optical fiber assembly 130 may be inclined relative to the central axis C of the first sub-fixing member 144*a*.

Figure 6B:
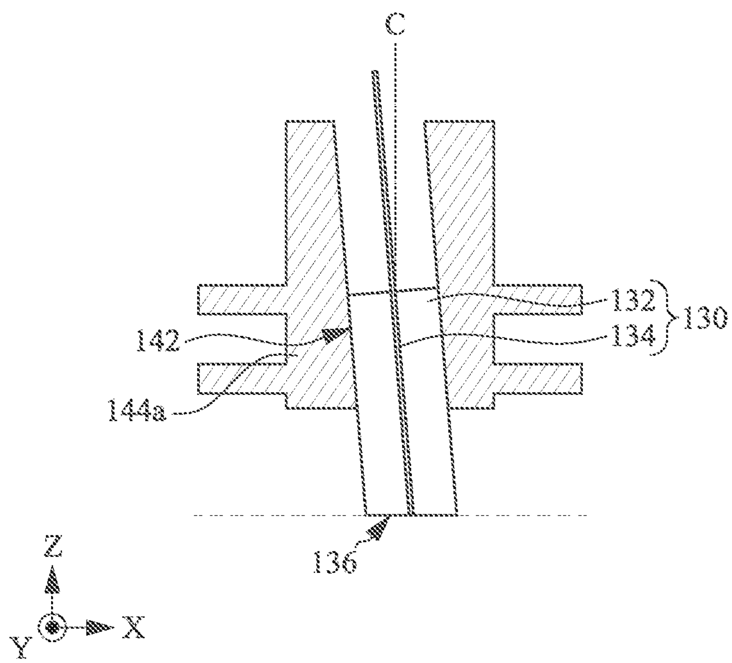
FIGS. 6B to 6D show cross-sectional views of an intermediate stage of a manufacturing method of the optical fiber transmission device of FIG. 6A.
Figure 6C:
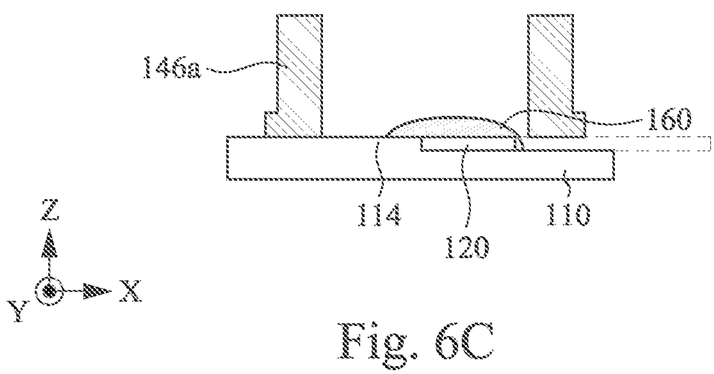
Figure 6D:
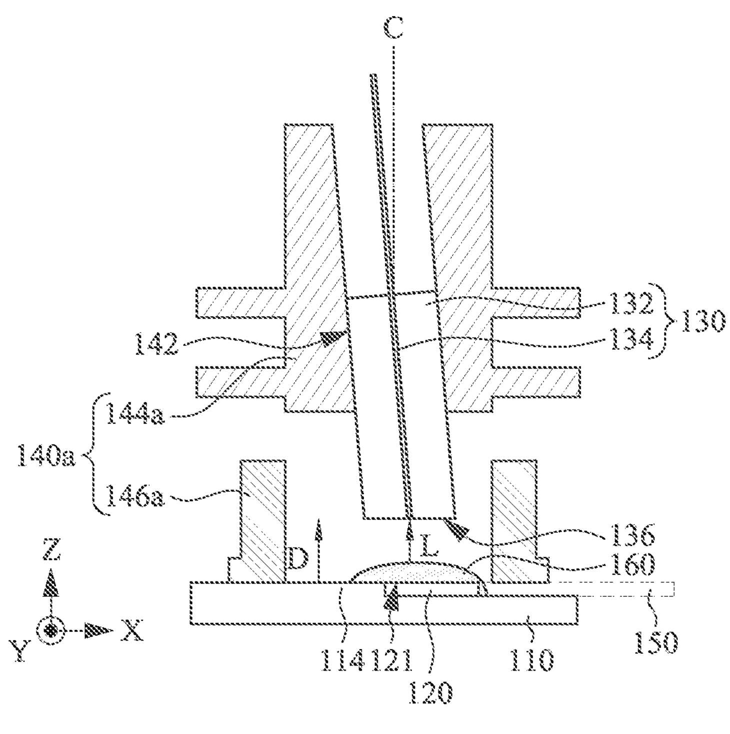

FIGS. 6B to 6D show cross-sectional views of an intermediate stage of a manufacturing method of the optical fiber transmission device of FIG. 6A. Steps of forming a protruding structure 114, the photonic integrated circuit 120 and a flexible circuit board 150 are the same as those in the embodiment of FIG. 5A. Details are not repeated again. Referring to FIG. 6B, the inclined inner side wall 142 is formed in the first sub-fixing member 144*a*, and then, the optical fiber assembly 130 is positioned in the first sub-fixing member 144*a*. Because the first sub-fixing member 144*a* has the inclined inner side wall 142, after the optical fiber assembly 130 is positioned in the first sub-fixing member 144*a*, the extending direction of the optical fiber assembly 130 is inclined relative to the central axis C of the first sub-fixing member 144*a*. After this step, a bottom end (i.e., one end facing the photonic integrated circuit 120 shown in FIG. 6D) of the optical fiber assembly 130 may be ground, so that the optical fiber assembly 130 forms a horizontal ground end face 136.

Referring to FIG. 6C, the second sub-fixing member 146*a* may be disposed on the substrate 110. The second sub-fixing member 146*a* may be fixed on the substrate 110 through resistance welding (Resistance welding), which is beneficial to stability. In addition, an optical clear adhesive 160 may be used to cover the photonic integrated circuit 120 and its adjacent substrate 110 to increase sealing performance.

Referring to FIG. 6D, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member 144*a* may be disposed on the second sub-fixing member 146*a*, so that the second sub-fixing member 146*a* supports the first sub-fixing member 144*a*. The first sub-fixing member 144*a* may be fixed on the second sub-fixing member 146*a* through laser welding, to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*a* shown in FIG. 6A may be obtained.

Figure 7A:
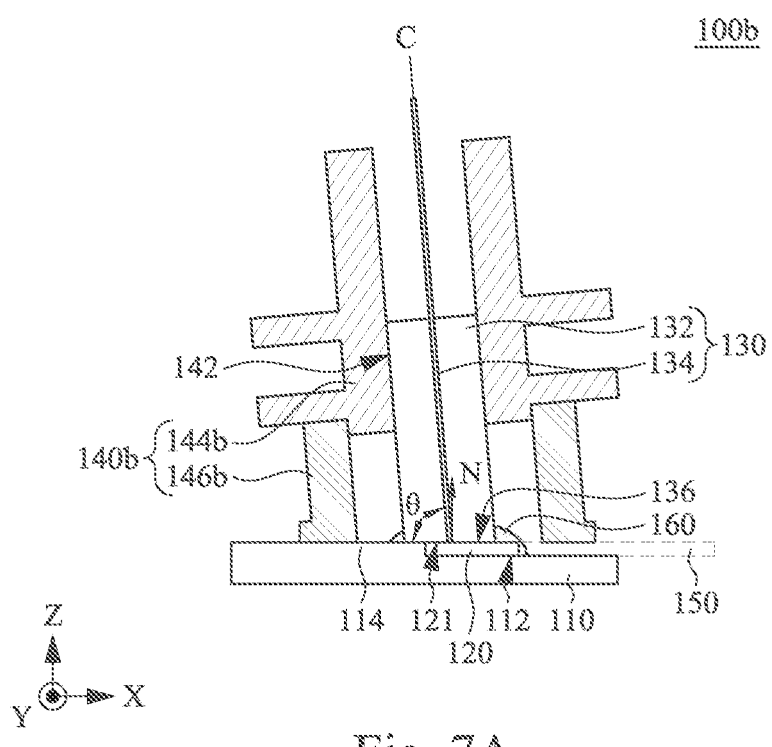
FIG. 7A shows a cross-sectional view of an optical fiber transmission device according to another embodiment of the present disclosure.

FIG. 7A shows a cross-sectional view of an optical fiber transmission device 100*b* according to another embodiment of the present disclosure. The optical fiber transmission device 100*b* includes the substrate 110, the photonic integrated circuit 120, the optical fiber assembly 130, and a fixing member 140*b*. The fixing member 140*b* includes a first sub-fixing member 144*b* and a second sub-fixing member 146*b*. This embodiment is different from the embodiment of FIG. 6A in that an inner side wall 142 of the first sub-fixing member 144*b* is not inclined (that is, the inner side wall 142 is parallel to the central axis C), and the second sub-fixing member 146*b* is obliquely disposed on the substrate 110. After the first sub-fixing member 144*b* sleeves the optical fiber assembly 130, the extending direction of the optical fiber assembly 130 overlaps with the central axis C of the first sub-fixing member 144*b*. In this embodiment, the central axis C of the first sub-fixing member 144*b* is the same as that of the second sub-fixing member 146*b*, and the central axis C is disposed obliquely relative to the normal direction N of the horizontal plane 121 of the photonic integrated circuit 120.

Figure 7B:
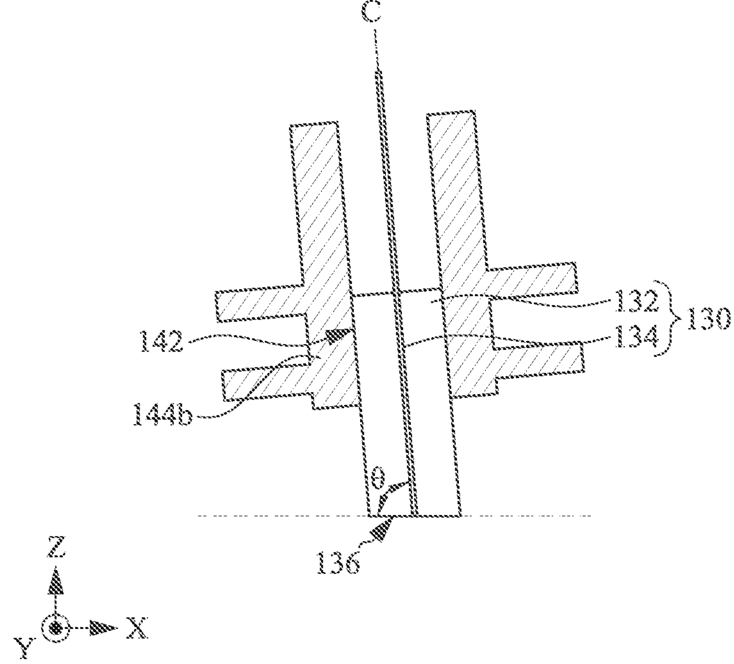
FIGS. 7B to 7D show cross-sectional views of an intermediate stage of a manufacturing method of the optical fiber transmission device of FIG. 7A.
Figure 7C:
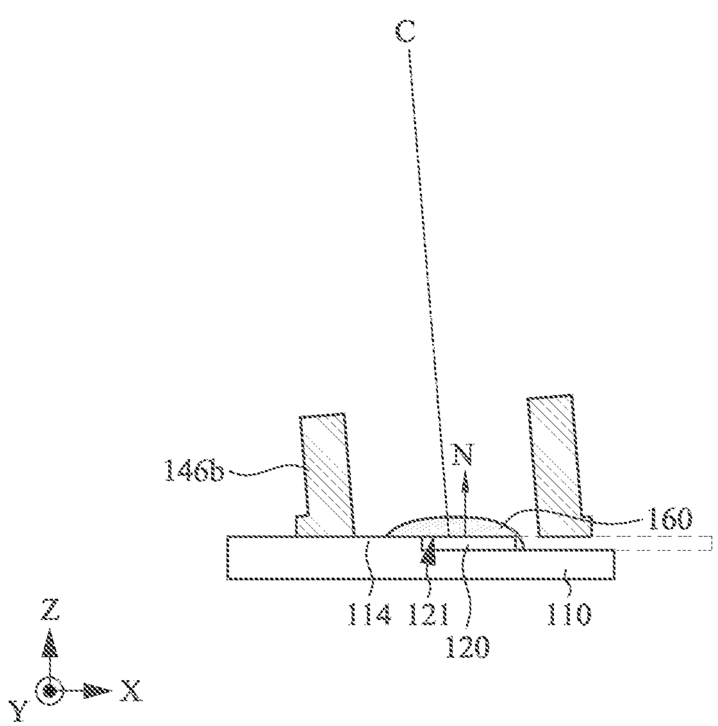
Figure 7D:
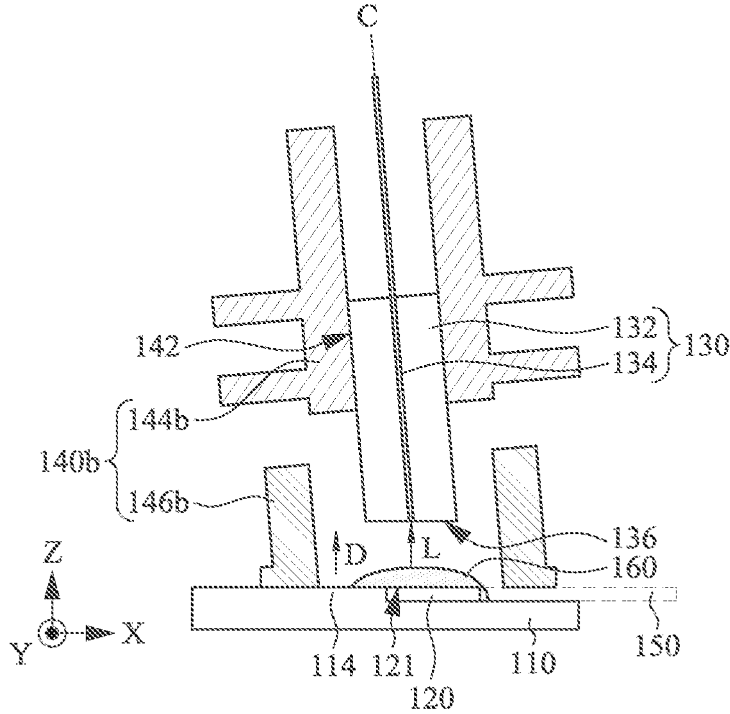

FIGS. 7B to 7D show cross-sectional views of an intermediate stage of a manufacturing method of the optical fiber transmission device 100*b* of FIG. 7A. Steps of forming a protruding structure 114, the photonic integrated circuit 120 and a flexible circuit board 150 are the same as those in the embodiment of FIG. 5A. Details are not repeated again. Referring to FIG. 7B, the optical fiber assembly 130 is positioned in the first sub-fixing member 144*b*, and then, the first sub-fixing member 144*b* and the optical fiber assembly

130 clamped by the first sub-fixing member **144*b* are both inclined at an angle, for example, the first sub-fixing member 144*b* is inclined relative to the normal direction N (see FIG. 7C) of the horizontal plane 121 of the photonic integrated circuit 120. In this embodiment, the extending direction of the optical fiber assembly 130 overlaps with the central axis C of the first sub-fixing member 144*b*. After this step, a bottom end (i.e., one end facing the photonic integrated circuit 120 shown in FIG. 7D) of the optical fiber assembly 130 may be ground, so that the optical fiber assembly 130 forms the horizontal ground end face 136. The ground end face 136 forms an acute angle θ with the extending direction of the optical fiber assembly 130 or with the central axis C of the first sub-fixing member 144*b***.

Referring to FIG. 7C, the second sub-fixing member **146*b* may be obliquely disposed on the substrate 110, so that the central axis C of the second sub-fixing member 146*b* is inclined relative to the normal direction N of the horizontal plane 121 of the photonic integrated circuit 120. In some embodiments, heights of different sides of the second sub-fixing member 146*b* may be different, such as higher on the right side and lower on the left side. The second sub-fixing member 146*b* may be fixed on the substrate 110 through resistance welding, which is beneficial to stability. In addition, an optical clear adhesive 160 may be used to cover the photonic integrated circuit 120 and its adjacent substrate 110** to increase sealing performance.

Referring to FIG. 7D, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member **144*b* may be disposed on the second sub-fixing member 146*b*, so that the second sub-fixing member 146*b* supports the first sub-fixing member 144*b*, and the central axis C of the first sub-fixing member 144*b* is inclined relative to the normal direction N of the horizontal plane 121 of the photonic integrated circuit 120 (as shown in FIG. 7A). The first sub-fixing member 144*b* may be fixed on the second sub-fixing member 146*b* through laser welding to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*b* shown in FIG. 7**A may be obtained.

Figures 8A, 8B:
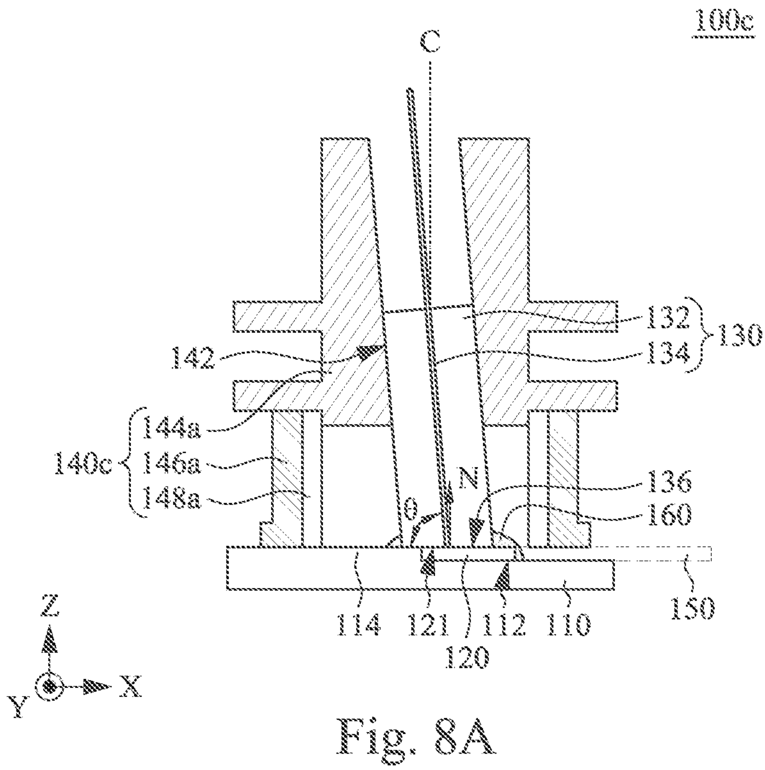
FIG. 8A shows a cross-sectional view of an optical fiber transmission device according to another embodiment of the present disclosure.
FIGS. 8B to 8D show cross-sectional views of an intermediate stage of a manufacturing method of the optical fiber transmission device of FIG. 8A.

FIG. 8A shows a cross-sectional view of an optical fiber transmission device **100*c* according to another embodiment of the present disclosure. The optical fiber transmission device 100*c* includes the substrate 110, the photonic integrated circuit 120, the optical fiber assembly 130, and a fixing member 140*c*. This embodiment is different from the embodiment of FIG. 6A in that the fixing member 140*c* includes a first sub-fixing member 144*a*, a second sub-fixing member 146*a*, and a third sub-fixing member 148*a*, and the third sub-fixing member 148*a* is configured to engage the first sub-fixing member 144*a* and the second sub-fixing member 146*a*. A bottom of the third sub-fixing member 148*a* may abut against a protruding structure 114 of the substrate 110**.

Figure 8C:
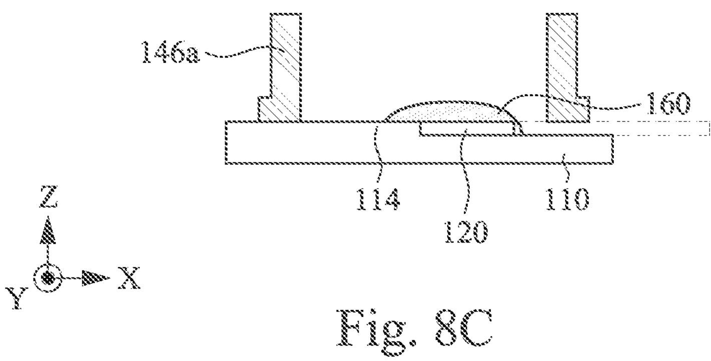
Figure 8D:
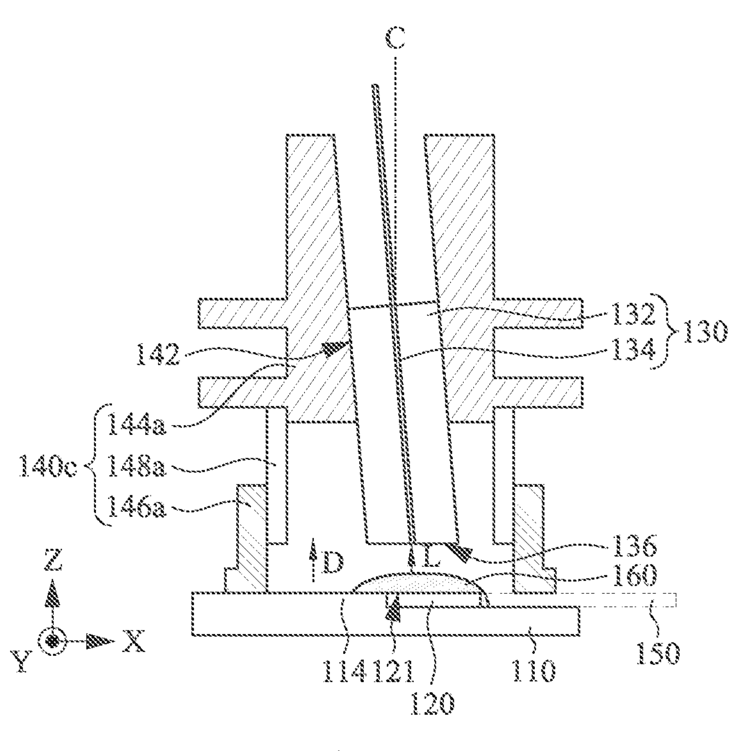

FIGS. 8B to 8D show cross-sectional views of an intermediate stage of a manufacturing method of the optical fiber transmission device **100*c* of FIG. 8A. Steps of forming the protruding structure 114, the photonic integrated circuit 120 and a flexible circuit board 150 are the same as those in the embodiment of FIG. 5A. Details are not repeated again. Referring to FIG. 8B, an inclined inner side wall 142 is formed in the first sub-fixing member 144*a*, and then, the optical fiber assembly 130 is positioned in the first sub-fixing member 144*a*. Because the first sub-fixing member 144*a* has the inclined inner side wall 142, after the optical fiber assembly 130 is positioned in the first sub-fixing member 144*a*, the extending direction of the optical fiber assembly 130 is inclined relative to the central axis C of the first sub-fixing member 144*a*. After this step, a bottom end (i.e., one end facing the photonic integrated circuit 120 shown in FIG. 8D) of the optical fiber assembly 130 may be ground, so that the optical fiber assembly 130 forms the horizontal ground end face 136. Thereafter, the first sub-fixing member 144*a* may be disposed on the third sub-fixing member 148*a*. The first sub-fixing member 144*a* may be fixed on the third sub-fixing member 148*a*** through laser welding, to facilitate rapid positioning and improve accuracy of alignment.

Referring to FIG. 8C, the second sub-fixing member **146*a* may be disposed on the substrate 110. The second sub-fixing member 146*a* may be fixed on the substrate 110 through resistance welding, which is beneficial to stability. In addition, an optical clear adhesive 160 may be used to cover the photonic integrated circuit 120 and its adjacent substrate 110** to increase sealing performance.

Referring to FIG. 8D, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member **144*a* may be disposed on the second sub-fixing member 146*a* by using the third sub-fixing member 148*a*, so that the third sub-fixing member 148*a* engages the first sub-fixing member 144*a* and the second sub-fixing member 146*a*. Because the extending direction of the optical fiber assembly 130 is disposed obliquely relative to the normal direction N of the horizontal plane 121 of the photonic integrated circuit 120 (see FIG. 8A), a depth of the third sub-fixing member 148*a* entering the second sub-fixing member 146*a* may be used to adjust a horizontal position of the optical fiber assembly 130 relative to the horizontal plane 121 of the photonic integrated circuit 120 (for example, an X-axis direction of an XY plane). The third sub-fixing member 148*a* may be fixed on the second sub-fixing member 146*a* through laser welding, to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*c* shown in FIG. 8**A may be obtained.

Figure 9A:
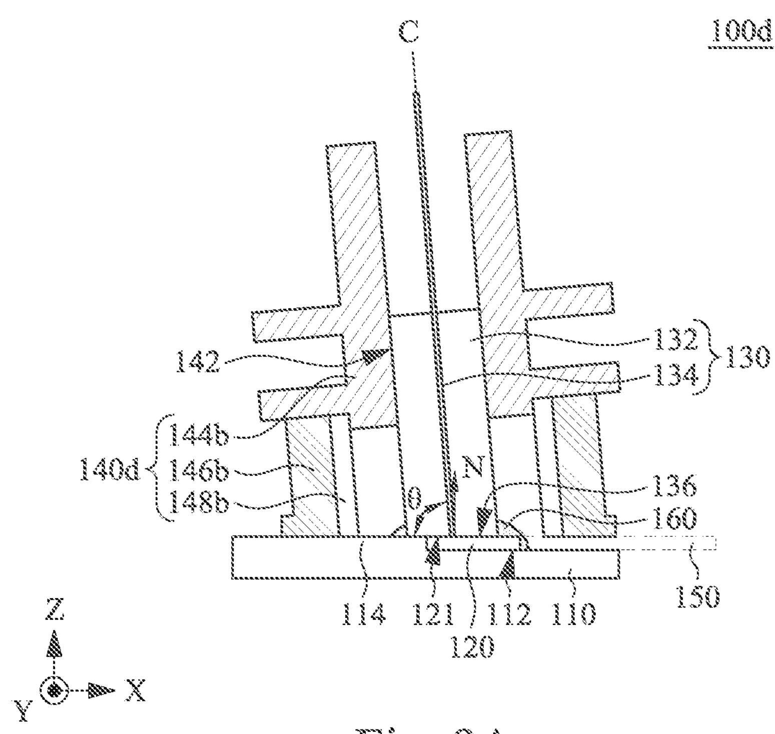
FIG. 9A shows a cross-sectional view of an optical fiber transmission device according to an embodiment of the present disclosure.

FIG. 9A shows a cross-sectional view of an optical fiber transmission device **100*d* according to an embodiment of the present disclosure. The optical fiber transmission device 100*d* includes the substrate 110, the photonic integrated circuit 120, the optical fiber assembly 130, and a fixing member 140***d*. This embodiment is different from the embodiment of FIG. 7A in that the fixing member 140*d* includes a first sub-fixing member 144*b*, a second sub-fixing member 146*b*, and a third sub-fixing member 148*b*, and the third sub-fixing member 148*b* is configured to engage the first sub-fixing member 144*b* and the second sub-fixing member 146*b*.

Figure 9B:
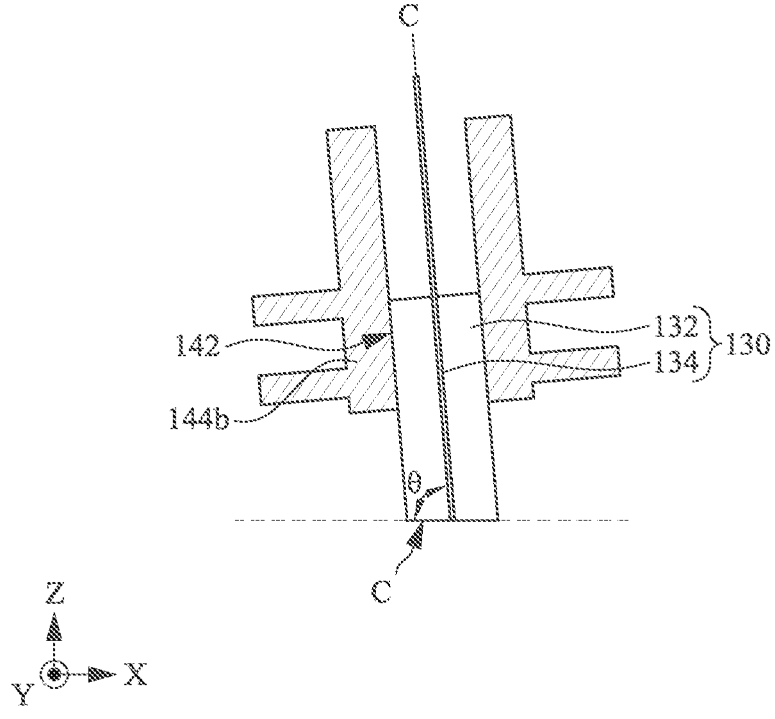
FIGS. 9B to 9E show cross-sectional views of an intermediate stage of a manufacturing method of the optical fiber transmission device of FIG. 9A.

FIGS. 9B to 9E show cross-sectional views of an intermediate stage of a manufacturing method of the optical fiber transmission device 100*d* of FIG. 9A. Steps of forming a protruding structure 114, the photonic integrated circuit 120 and a flexible circuit board 150 are the same as those in the embodiment of FIG. 5A. Details are not repeated again. Referring to FIG. 9B, the optical fiber assembly 130 is positioned in the first sub-fixing member 144*b*, and then, the first sub-fixing member 144*b* and the optical fiber assembly 130 clamped by the first sub-fixing member 144*b* are both inclined at an angle, for example, the first sub-fixing member 144*b* is inclined relative to the normal direction N of the horizontal plane 121 of the photonic integrated circuit 120 (see FIG. 9E). After this step, a bottom end (i.e., one end facing the photonic integrated circuit 120 shown in FIG. 9E) of the optical fiber assembly 130 may be ground, so that the optical fiber assembly 130 forms the horizontal ground end face 136. The ground end face 136 forms an acute angle θ with the extending direction of the optical fiber assembly 130 or with the central axis C of the first sub-fixing member 144*b*.

Figure 9C:
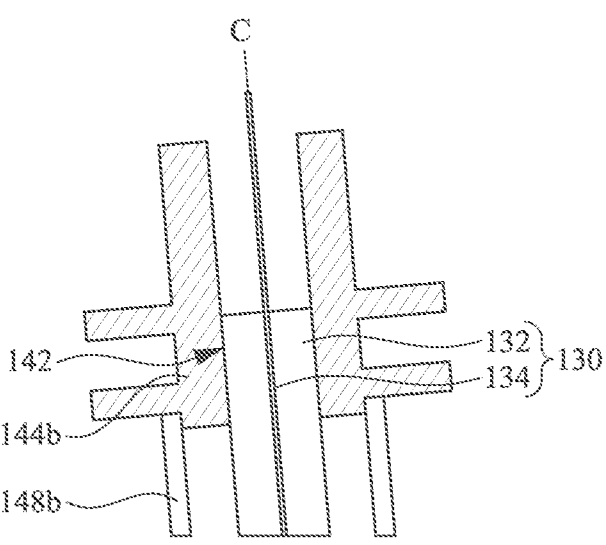

Referring to FIG. 9C, then, the first sub-fixing member 144*b* may be disposed on the third sub-fixing member 148*b*. The third sub-fixing member 148*b* and the first sub-fixing member 144*b* have the same central axis C. The first sub-fixing member 144*b* may be fixed on the third sub-fixing member 148*b* through laser welding, to facilitate rapid positioning and improve accuracy of alignment.

Figure 9D:
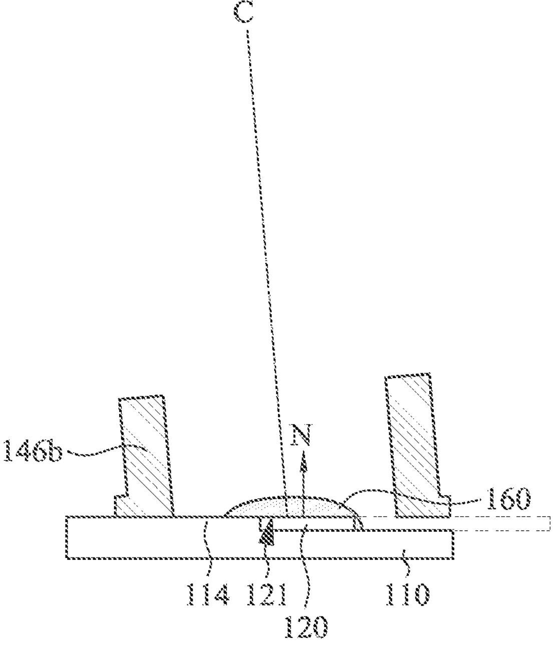

Referring to FIG. 9D, the second sub-fixing member 146*b* may be obliquely disposed on the substrate 110, so that the central axis C of the second sub-fixing member 146*b* is inclined relative to the normal direction N of the horizontal plane 121 of the photonic integrated circuit 120. In some embodiments, heights of different sides of the second sub-fixing member 146*b* may be different, such as higher on the right side and lower on the left side. The second sub-fixing member 146*b* may be fixed on the substrate 110 through resistance welding, which is beneficial to stability. In addition, an optical clear adhesive 160 may be used to cover the photonic integrated circuit 120 and its adjacent substrate 110 to increase sealing performance.

Figure 9E:
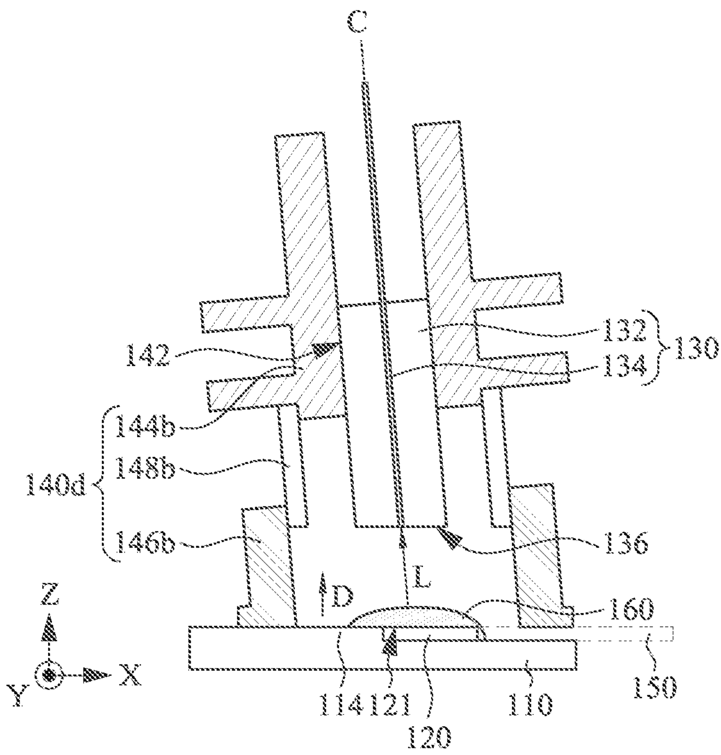

Referring to FIG. 9E, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member 144*b* may be disposed on the second sub-fixing member 146*b* by using the third sub-fixing member 148*b*, so that the third sub-fixing member 148*b* engages the first sub-fixing member 144*b* and the second sub-fixing member 146*b*. Because the extending direction of the optical fiber assembly 130 is disposed obliquely relative to the normal direction N of the horizontal plane 121 of the photonic integrated circuit 120, a depth of the third sub-fixing member 148*b* entering the second sub-fixing member 146*b* may be used to adjust a horizontal position of the optical fiber assembly 130 relative to the horizontal plane 121 of the photonic integrated circuit 120 (for example, an X-axis direction of an XY plane). The third sub-fixing member 148*b* may be fixed on the second sub-fixing member 146*b* through laser welding, to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*d* shown in FIG. 9A may be obtained.

Figure 10A:
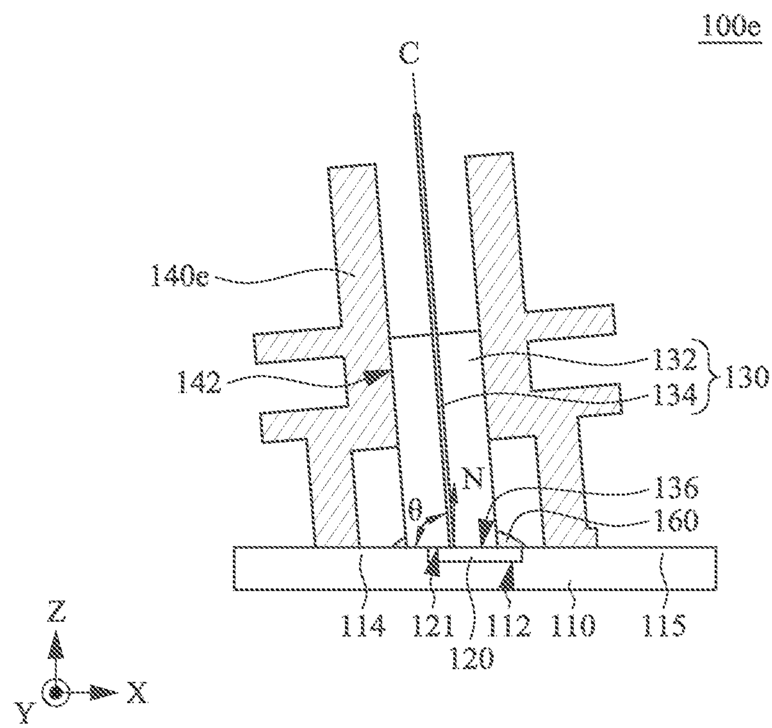
FIG. 10A shows a cross-sectional view of an optical fiber transmission device according to another embodiment of the present disclosure.

FIG. 10A shows a cross-sectional view of an optical fiber transmission device 100*e* according to another embodiment of the present disclosure. The optical fiber transmission device 100*e* includes the substrate 110, the photonic integrated circuit 120, the optical fiber assembly 130, and a fixing member 140*e*. This embodiment is different from the embodiment of FIG. 5A in that an inner side wall 142 of the fixing member 140*e* is not inclined and there is no adhesive 170 on the inner side wall 142, and the fixing member 140*e* is obliquely disposed on the substrate 110. After the fixing member 140*e* sleeves the optical fiber assembly 130, the extending direction of the optical fiber assembly 130 overlaps with the central axis C of the fixing member 140*e*. In this embodiment, the central axis C of the fixing member 140*e* is disposed obliquely relative to the normal direction N of the horizontal plane 121 of the photonic integrated circuit 120.

It should be noted that, in FIGS. 10A to 13E, according to the cross-sectional views of the substrate 110 of another embodiment of the present disclosure (see FIG. 3), fixing members 140*e*, 140*f*, 140*g*, and 140*h* may be disposed on protruding structures 114 and 115 of the substrate 110. However, this is designed based on an actual requirement, but is not limited by this embodiment.

Figure 10B:
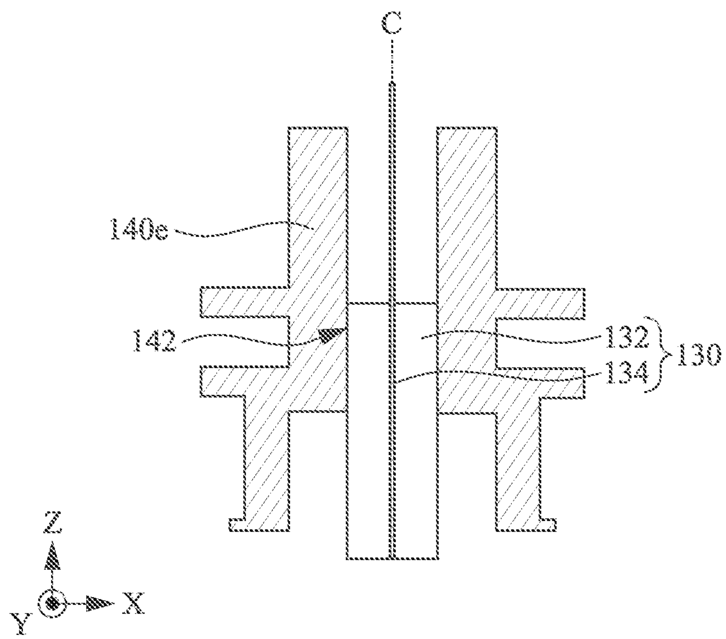
FIGS. 10B to 10D show cross-sectional views of an intermediate stage of a manufacturing method of the optical fiber transmission device of FIG. 10A.
Figure 10C:
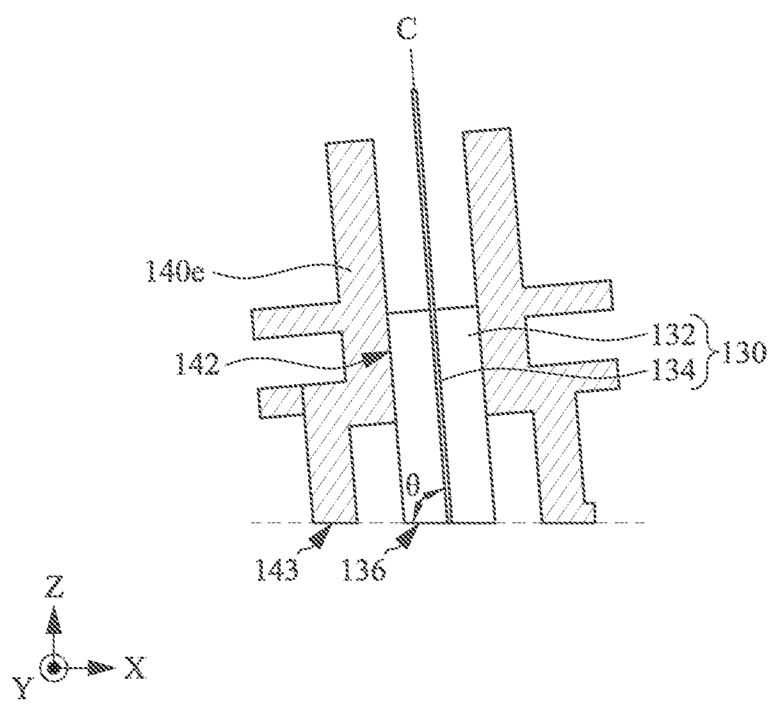
Figure 10D:
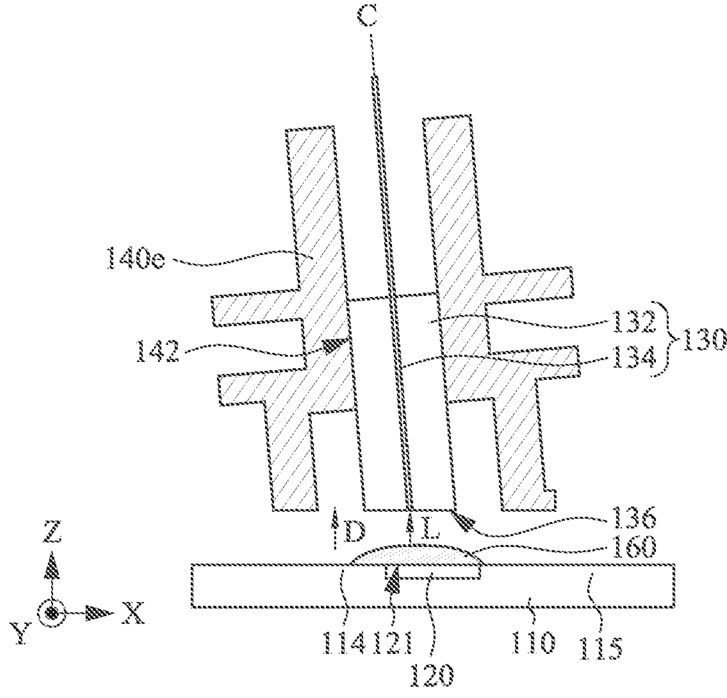

FIGS. 10B to 10D show cross-sectional views of an intermediate stage of a manufacturing method of the optical fiber transmission device 100*e* of FIG. 10A. Steps of forming a protruding structure 114, the photonic integrated circuit 120 and a flexible circuit board 150 are the same as those in the embodiment of FIG. 5A. Details are not repeated again. Referring to FIGS. 10B and 10C, the optical fiber assembly 130 is positioned in the fixing member 140*e*, and then, the fixing member 140*e* and the optical fiber assembly 130 clamped by the fixing member 140*e* are both inclined at an angle, for example, the fixing member 140*e* is inclined relative to the normal direction N of the horizontal plane 121 of the photonic integrated circuit 120 (see FIG. 10D). In this embodiment, the extending direction of the optical fiber assembly 130 overlaps with the central axis C of the fixing member 140*e*. After this step, bottom ends (i.e., one end facing the photonic integrated circuit 120 shown in FIG. 10D) of the fixing member 140*e* and the optical fiber assembly 130 may be synchronously ground, so that the fixing member 140*e* forms a horizontal ground end face 143, and the optical fiber assembly 130 forms the horizontal ground end face 136. Ground end faces 136 and 143 are both parallel to the horizontal plane 121 of the photonic integrated circuit 120 (see FIG. 10D). The ground end face 136 forms an acute angle θ with the extending direction of the optical fiber assembly 130 or with the central axis C of the fixing member 140*e*.

Referring to FIG. 10D, then, optical alignment may be performed on an optical fiber 134 and the photonic integrated circuit 120, so that light L emitted by the photonic integrated circuit 120 is optically coupled with the optical fiber 134. Before the fixing member 140*e* is disposed on the substrate 110, an optical clear adhesive 160 may be used to cover the photonic integrated circuit 120 and its adjacent substrate 110 to increase sealing performance. Thereafter, the fixing member 140*e* may be disposed on the substrate 110, so that the protruding structure 114 of the substrate 110 may abut against a ferrule 132 to limit a position of the optical fiber assembly 130 in a vertical direction D (i.e., a Z-axis direction) of the substrate 110, to serve as a stopper for the optical fiber assembly 130 in the vertical direction D. The fixing member 140*e* may be fixed on the substrate 110 through laser welding, to facilitate rapid positioning and improve accuracy of optical alignment. In some embodiments, the optical clear adhesive 160 may be used to bond the optical fiber assembly 130 and the photonic integrated circuit 120, and fill gaps between the optical fiber assembly 130, the photonic integrated circuit 120 and the substrate 110 to provide a sealing effect. The light transmittance of the optical clear adhesive 160 is greater than 50%, which facilitates optical transmission between the optical fiber 134 and the photonic integrated circuit 120. Through the above steps, the optical fiber transmission device 100*e* shown in FIG. 10A may be obtained.

Figure 11A:
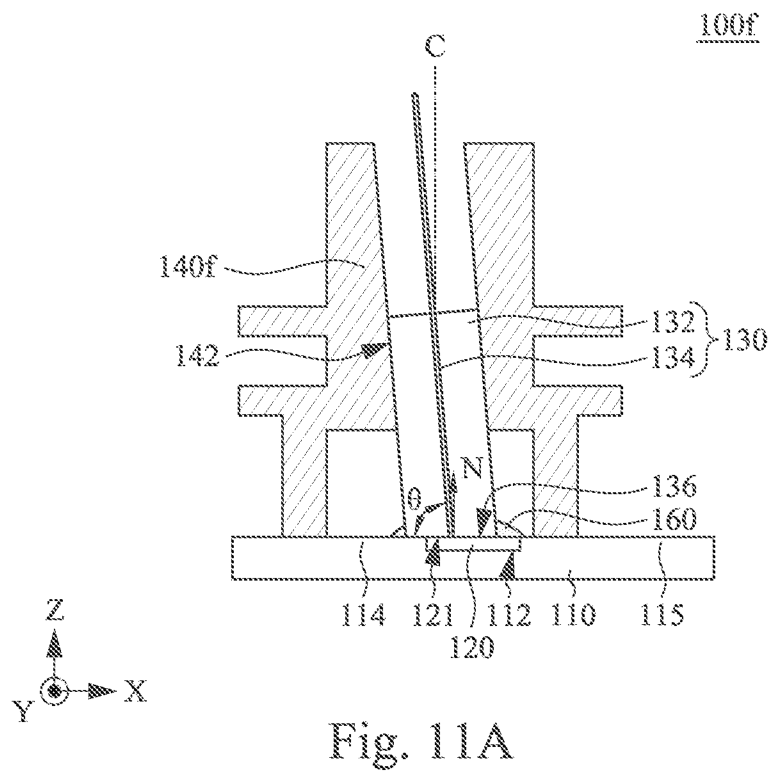
FIG. 11A shows a cross-sectional view of an optical fiber transmission device according to another embodiment of the present disclosure.

FIG. 11A shows a cross-sectional view of an optical fiber transmission device 100*f* according to another embodiment of the present disclosure. The optical fiber transmission device 100*f* includes the substrate 110, the photonic integrated circuit 120, the optical fiber assembly 130, and a fixing member 140*f*. This embodiment is different from the embodiment of FIG. 10A in that the fixing member 140*f* has an inclined inner side wall 142, so that after the optical fiber assembly 130 is sleeved, the extending direction of the optical fiber assembly 130 may be inclined relative to the central axis C of the fixing member 140*f*. In addition, a bottom end of the fixing member 140*f* is ground.

Figure 11B:
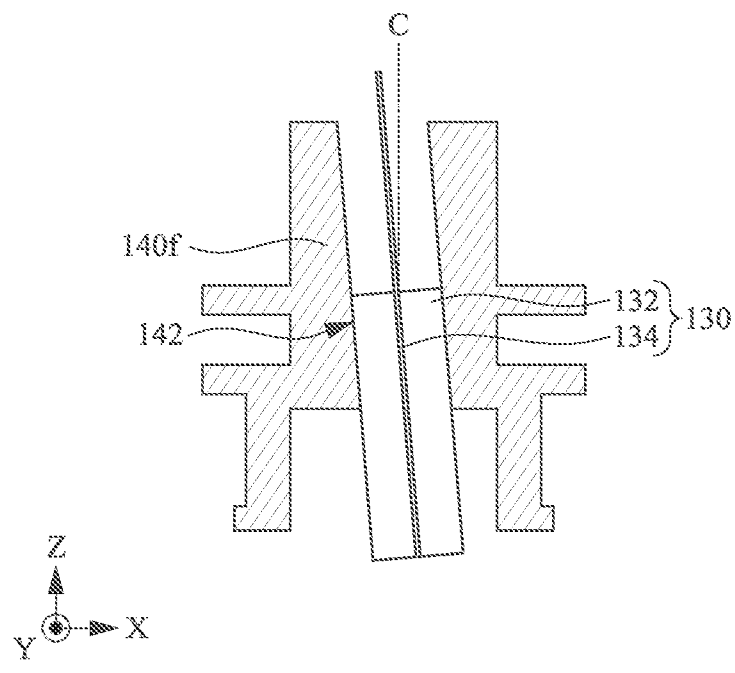
FIGS. 11B to 11D show cross-sectional views of an intermediate stage of a manufacturing method of the optical fiber transmission device of FIG. 11A.
Figure 11C:
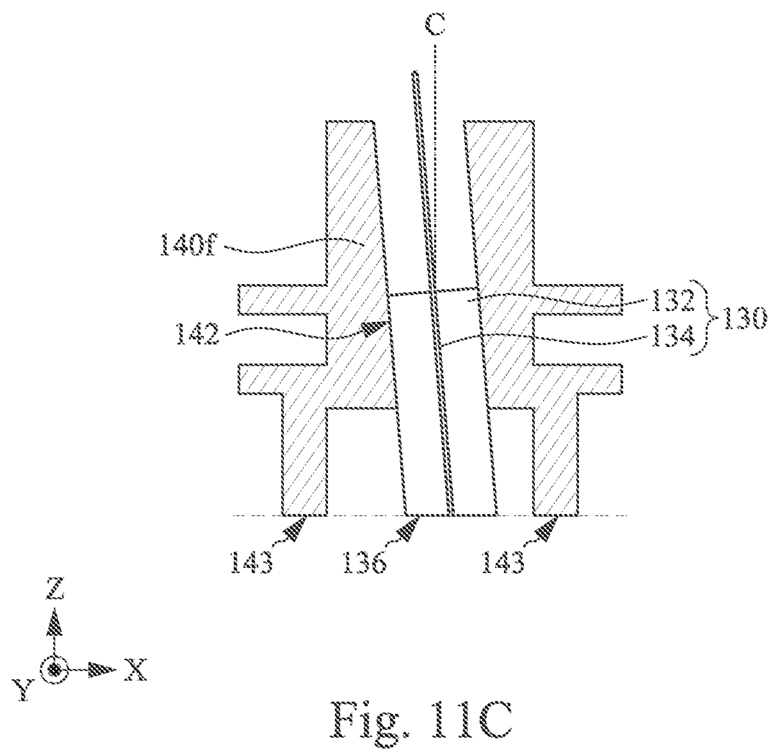
Figure 11D:
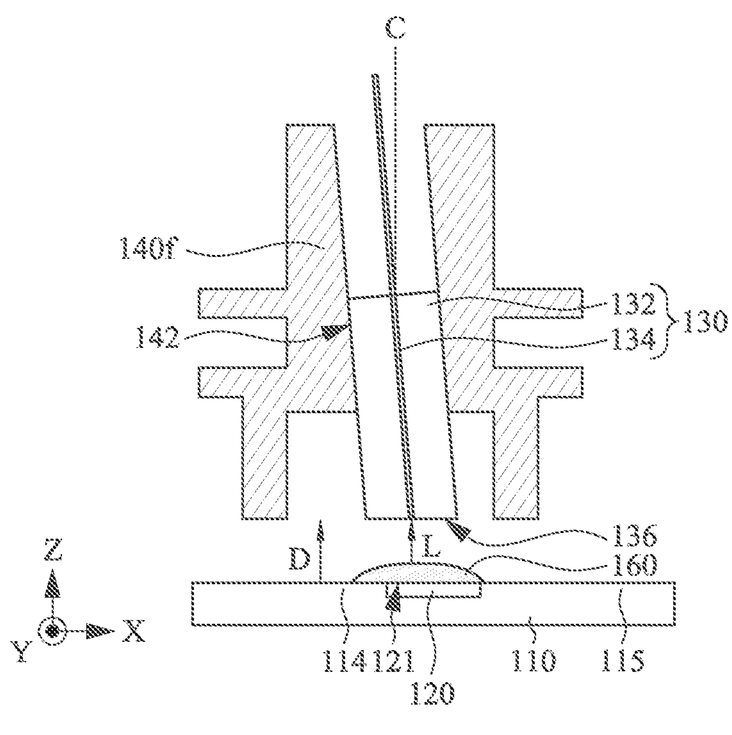

FIGS. 11B to 11D show cross-sectional views of an intermediate stage of a manufacturing method of the optical fiber transmission device 100*f* of FIG. 11A. Steps of forming a protruding structure 114, the photonic integrated circuit 120 and a flexible circuit board 150 are the same as those in the embodiment of FIG. 5A. Details are not repeated again. Referring to FIG. 11B, the inclined inner side wall 142 is formed in the fixing member 140*f*, and then, the optical fiber assembly 130 is positioned in the fixing member 140*f*. Because the fixing member 140*f* has the inclined inner side wall 142, after the optical fiber assembly 130 is positioned in the fixing member 140*f*, the extending direction of the optical fiber assembly 130 is inclined relative to the central axis C of the fixing member 140*f*. After this step, a bottom surface of the optical fiber assembly 130 is not horizontal.

Referring to FIG. 11C, then, bottom ends (i.e., one end facing the photonic integrated circuit 120 shown in FIG. 11D) of the fixing member 140*f* and the optical fiber assembly 130 may be synchronously ground, so that the fixing member 140*f* forms the horizontal ground end face 143, and the optical fiber assembly 130 forms the horizontal ground end face 136. After this step, the bottom surface (i.e., the ground end face 136) of the optical fiber assembly 130 and a bottom surface (i.e., the ground end face 143) of the fixing member 140*f* is horizontal.

Referring to FIG. 11D, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Before the fixing member 140*f* is disposed on the substrate 110, an optical clear adhesive 160 may be used to cover the photonic integrated circuit 120 and its adjacent substrate 110 to increase sealing performance. Thereafter, the fixing member 140*f* may be disposed on the substrate 110, so that the protruding structure 114 of the substrate 110 may abut against a ferrule 132 to limit a position of the optical fiber assembly 130 in a vertical direction D (i.e., a Z-axis direction) of the substrate 110, to serve as a stopper for the optical fiber assembly 130 in the vertical direction D. The fixing member 140*f* may be fixed on the substrate 110 through laser welding, to facilitate rapid positioning and improve accuracy of optical alignment. The optical clear adhesive 160 may bond the optical fiber assembly 130. Through the above steps, the optical fiber transmission device 100*f* shown in FIG. 11A may be obtained.

Figures 12A, 12B:
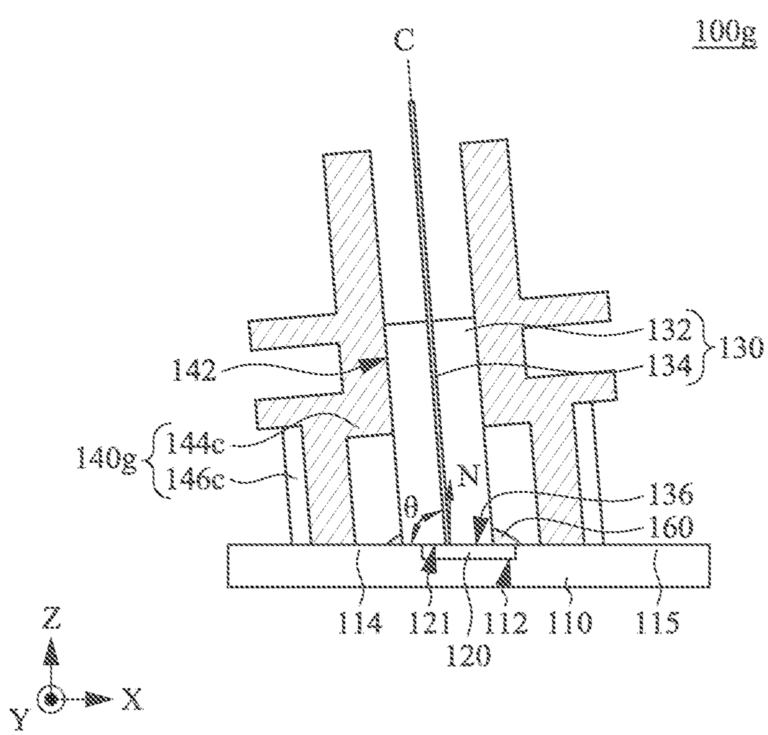
FIG. 12A shows a cross-sectional view of an optical fiber transmission device according to another embodiment of the present disclosure.
FIGS. 12B to 12E show cross-sectional views of an intermediate stage of a manufacturing method of the optical fiber transmission device of FIG. 12A.

FIG. 12A shows a cross-sectional view of an optical fiber transmission device 100*g* according to another embodiment of the present disclosure. The optical fiber transmission device 100*g* includes the substrate 110, the photonic integrated circuit 120, the optical fiber assembly 130, and a fixing member 140*g*. The fixing member 140*g* includes a first sub-fixing member 144*c* and a second sub-fixing member 146*c*. This embodiment is different from the embodiment of FIG. 10A in that the second sub-fixing member 146*c* is disposed on the substrate 110, and the second sub-fixing member 146*c* supports the first sub-fixing member 144*c*. In this embodiment, central axes C of the first sub-fixing member 144*c* and the second sub-fixing member 146*c* are inclined relative to the normal direction N of the horizontal plane 121 of the photonic integrated circuit 120. A bottom of the first sub-fixing member 144*c* may abut against protruding structures 114 and 115 of the substrate 110.

Figure 12C:
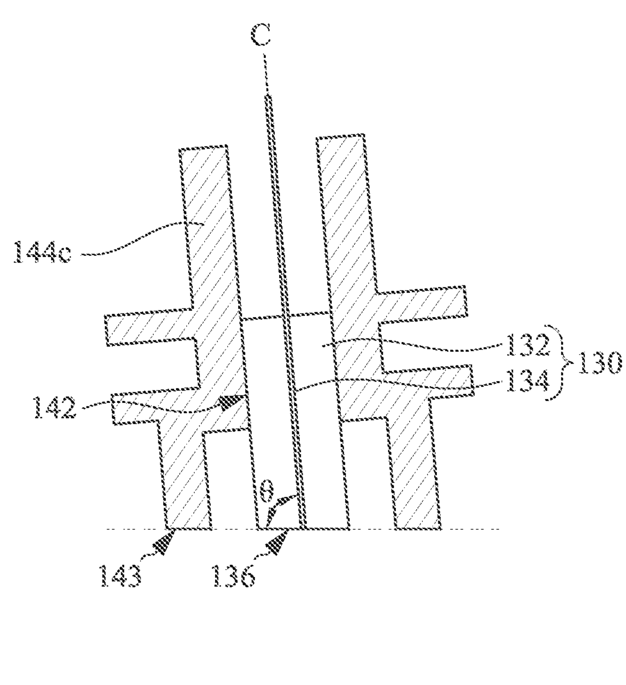

FIGS. 12B to 12E show cross-sectional views of an intermediate stage of a manufacturing method of the optical fiber transmission device 100*g* of FIG. 12A. Steps of forming a protruding structure 114, the photonic integrated circuit 120 and a flexible circuit board 150 are the same as those in the embodiment of FIG. 5A, and steps in FIGS. 12B and 12C are separately the same as those in FIGS. 10B and 10C. Details are not repeated again. After bottom ends of the fixing member 140*e* and the optical fiber assembly 130 are synchronously ground, the first sub-fixing member 144*c* may form the horizontal ground end face 143, and the optical fiber assembly 130 may form the horizontal ground end face 136.

Figure 12D:
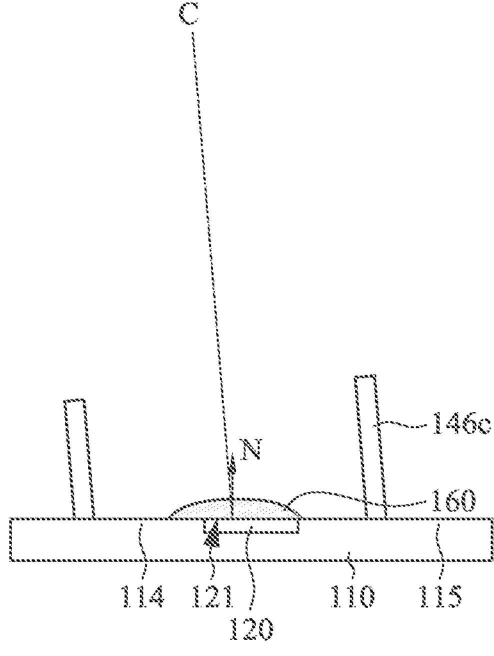

Thereafter, referring to FIG. 12D, the second sub-fixing member 146*c* may be obliquely disposed on the substrate 110, so that the central axis C of the second sub-fixing member 146*c* is inclined relative to the normal direction N of the horizontal plane 121 of the photonic integrated circuit 120. In some embodiments, heights of different sides of the second sub-fixing member 146*c* may be different, such as higher on the right side and lower on the left side. The second sub-fixing member 146*c* may be fixed on the substrate 110 through resistance welding, which is beneficial to stability. In addition, an optical clear adhesive 160 may be used to cover the photonic integrated circuit 120 and its adjacent substrate 110 to increase sealing performance.

Figure 12E:
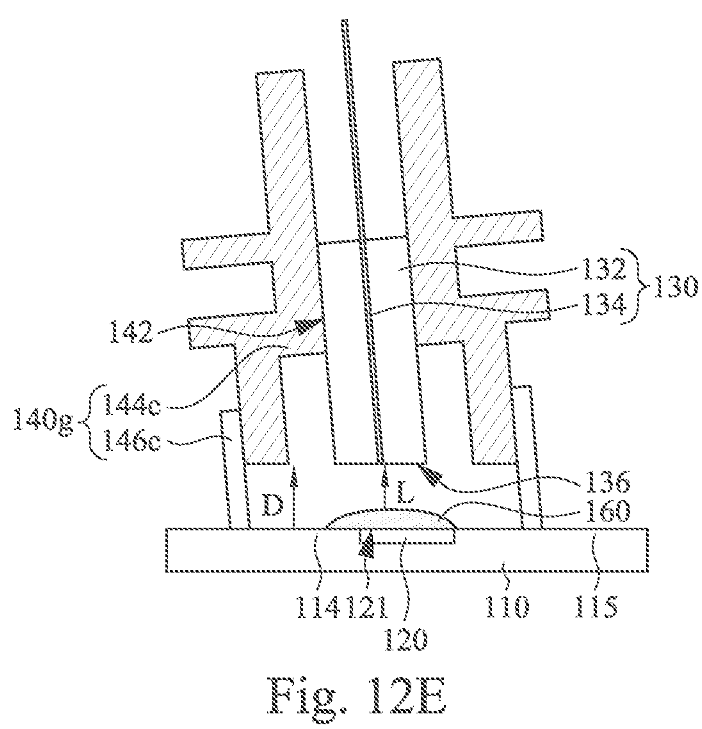

Referring to FIG. 12E, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member 144*c* may be disposed on the second sub-fixing member 146*c*, so that the second sub-fixing member 146*c* supports the first sub-fixing member 144*c*, and the central axis C of the first sub-fixing member 144*c* is inclined relative to the normal direction N of the horizontal plane 121 of the photonic integrated circuit 120. The first sub-fixing member 144*c* may be fixed on the second sub-fixing member 146*c* through laser welding, to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*g* shown in FIG. 12A may be obtained.

Figure 13A:
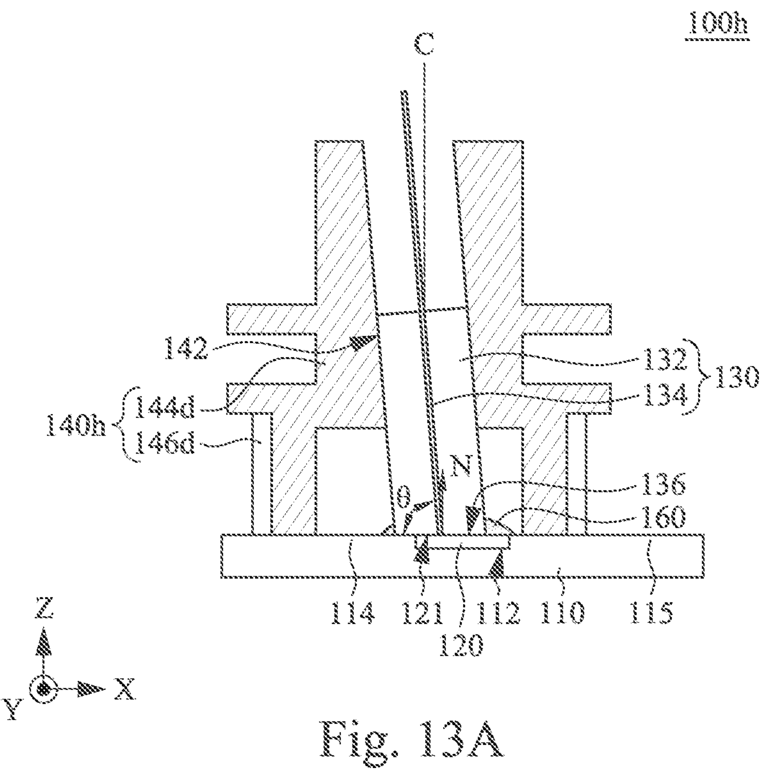
FIG. 13A shows a cross-sectional view of an optical fiber transmission device according to another embodiment of the present disclosure.

FIG. 13A shows a cross-sectional view of an optical fiber transmission device 100*h* according to another embodiment of the present disclosure. The optical fiber transmission device 100*h* includes the substrate 110, the photonic integrated circuit 120, the optical fiber assembly 130, and a fixing member 140*h*. This embodiment is different from the embodiment of FIG. 11A in that the fixing member 140*h* includes a first sub-fixing member 144*d* and a second sub-fixing member 146*d*, wherein the second sub-fixing member 146*d* is disposed on the substrate 110 and configured to support the first sub-fixing member 144*d*. In this embodiment, the first sub-fixing member 144*d* has an inclined inner side wall 142, so that after the optical fiber assembly 130 is sleeved, the extending direction of the optical fiber assembly 130 may be inclined relative to the central axis C of the first sub-fixing member 144*d*. A bottom of the first sub-fixing member 144*d* may abut against protruding structures 114 and 115 of the substrate 110.

Figure 13B:
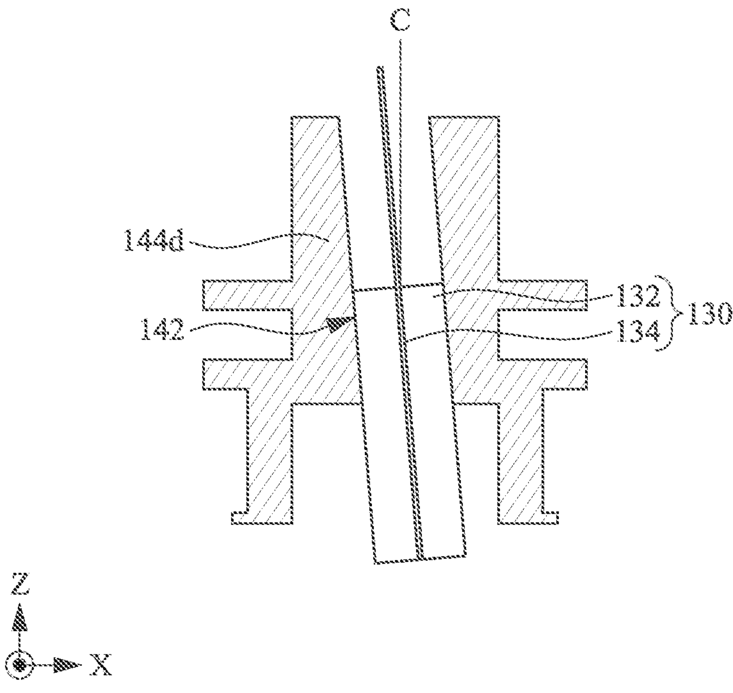
FIGS. 13B to 13E show cross-sectional views of an intermediate stage of a manufacturing method of the optical fiber transmission device of FIG. 13A.
Figure 13C:
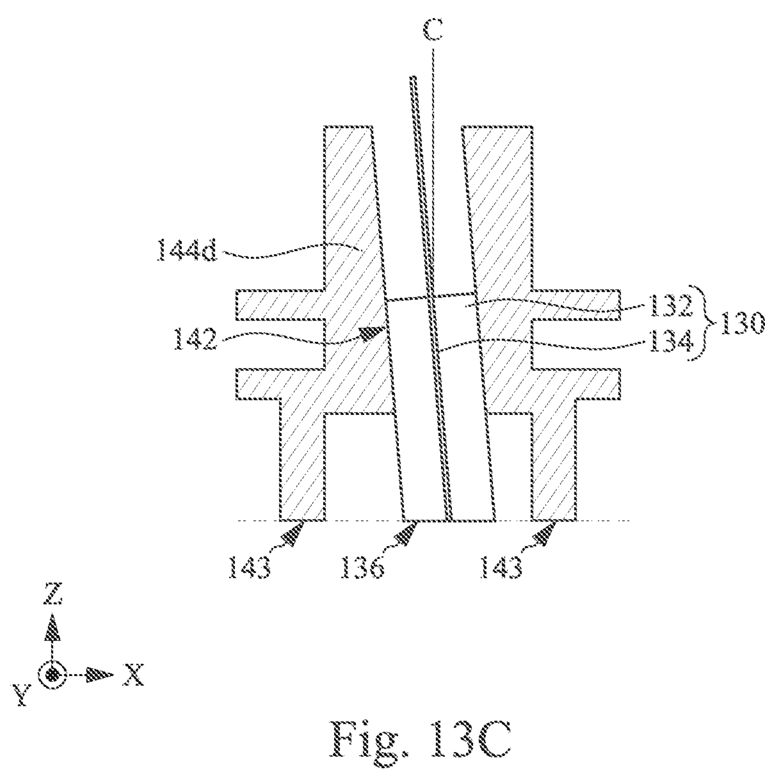

FIGS. 13B to 13E show cross-sectional views of an intermediate stage of a manufacturing method of the optical fiber transmission device 100*h* of FIG. 13A. Steps of forming a protruding structure 114, the photonic integrated circuit 120 and a flexible circuit board 150 are the same as those in the embodiment of FIG. 5A, and steps in FIGS. 13B and 13C are separately the same as those in FIGS. 11B and 11C. Details are not repeated again. After bottom ends of the fixing member 140*h* and the optical fiber assembly 130 are synchronously ground, the first sub-fixing member 144*d* may form the horizontal ground end face 143, and the optical fiber assembly 130 may form the horizontal ground end face 136.

Figure 13D:
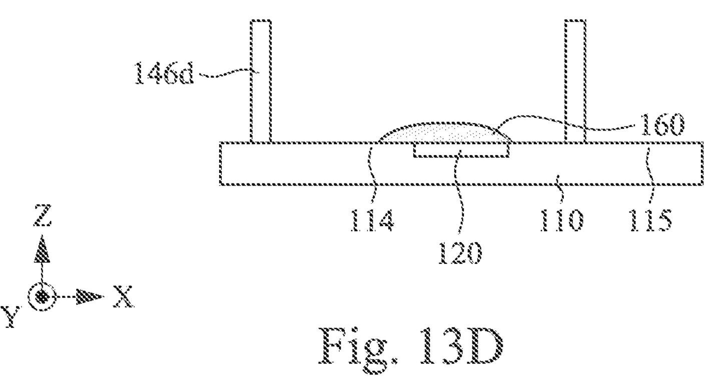

Referring to FIG. 13D, the second sub-fixing member 146*d* may be disposed on the substrate 110. The second sub-fixing member 146*d* may be fixed on the substrate 110 through resistance welding, which is beneficial to stability. In addition, an optical clear adhesive 160 may be used to cover the photonic integrated circuit 120 and its adjacent substrate 110 to increase sealing performance.

Figure 13E:
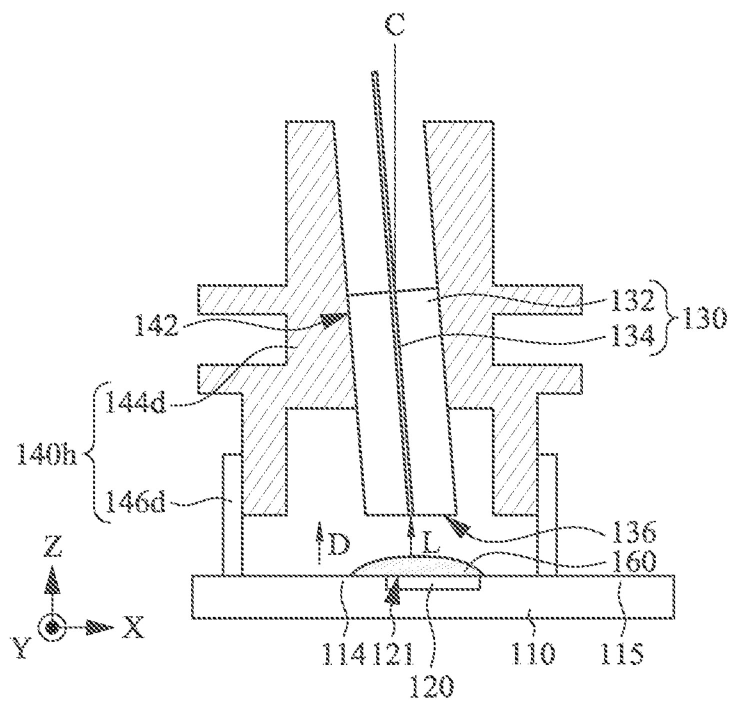

Referring to FIG. 13E, the ground end face 136 of the optical fiber assembly 130 is parallel to the horizontal plane 121 of the photonic integrated circuit 120, and optical alignment is performed on an optical fiber 134 and the photonic integrated circuit 120, so that light L emitted by the photonic integrated circuit 120 is optically coupled with the optical fiber 134. Thereafter, the first sub-fixing member 144*d* may be disposed on the second sub-fixing member 146*d*, so that the second sub-fixing member 146*d* supports the first sub-fixing member 144*d*. The first sub-fixing member 144*d* may be fixed on the second sub-fixing member 146*d* through laser welding, to facilitate rapid positioning and improve accuracy of optical alignment. In addition, the protruding structure 114 of the substrate 110 may abut against a ferrule 132 to limit a position of the optical fiber assembly 130 in a vertical direction D (i.e., a Z-axis direction) of the substrate 110 to serve as a stopper for the optical fiber assembly 130 in the vertical direction D. The optical clear adhesive 160 may bond the optical fiber assembly 130. Through the above steps, the optical fiber transmission device 100*h* shown in FIG. 13A may be obtained.

The foregoing outlines features of several embodiments, so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical fiber transmission device, comprising:

a substrate;

a photonic integrated circuit disposed on an area of the substrate, wherein the substrate has a protruding structure at an interface with an edge of the photonic integrated circuit;

an optical fiber assembly comprising an optical fiber and a ferrule that sleeves the optical fiber, wherein the protruding structure of the substrate is configured to abut against the ferrule to limit a position of the optical fiber assembly in a vertical direction of the substrate, such that the protruding structure is a stopper for the optical fiber assembly in the vertical direction; and a fixing member sleeving the optical fiber assembly, wherein the optical fiber assembly is optically coupled with the photonic integrated circuit in an extending direction of the optical fiber assembly, and the extending direction forms an acute angle with a horizontal plane of the photonic integrated circuit.

2. The optical fiber transmission device of claim 1, wherein one end of the optical fiber assembly that faces the photonic integrated circuit has a ground end face, and the ground end face is parallel to the horizontal plane of the photonic integrated circuit.

3. The optical fiber transmission device of claim 1, wherein the extending direction of the optical fiber assembly is disposed obliquely relative to a normal direction of the fall horizontal plane of the photonic integrated circuit.

4. The optical fiber transmission device of claim 1, further comprising:

an optical clear adhesive for bonding the optical fiber assembly and the photonic integrated circuit, wherein the optical clear adhesive has a light transmittance greater than 50%.

5. The optical fiber transmission device of claim 1, wherein the fixing member comprises a first sub-fixing member and a second sub-fixing member, and the second sub-fixing member is disposed on the substrate and configured to support the first sub-fixing member.

6. The optical fiber transmission device of claim 5, wherein central axes of the first sub-fixing member and the second sub-fixing member are disposed obliquely relative to a normal direction of the horizontal plane of the photonic integrated circuit.

7. The optical fiber transmission device of claim 5, wherein the fixing member further comprises a third sub-fixing member, the third sub-fixing member is configured to engage the first sub-fixing member and the second sub-fixing member, and configured to adjust a horizontal position of the optical fiber assembly relative to the horizontal plane of the photonic integrated circuit.

8. A manufacturing method of an optical fiber transmission device, comprising:

forming a protruding structure on a substrate;

disposing a photonic integrated circuit on an area of the substrate, wherein the protruding structure is located at an interface between the substrate and an edge of the photonic integrated circuit;

sleeving an optical fiber by a ferrule to form an optical fiber assembly, wherein a fixing member sleeves the optical fiber assembly;

grinding one end of the optical fiber assembly that faces the photonic integrated circuit, so that a ground end face is formed on the optical fiber assembly, and the ground end face is parallel to a horizontal plane of the photonic integrated circuit;

optically aligning the optical fiber with the photonic integrated circuit; and configuring the protruding structure of the substrate to abut against the ferrule to limit a position of the optical fiber assembly in a vertical direction of the substrate to serve as a stopper for the optical fiber assembly in the vertical direction, wherein the optical fiber assembly is optically coupled with the photonic integrated circuit in an extending direction of the optical fiber assembly, and the extending direction forms an acute angle with the horizontal plane of the photonic integrated circuit.

9. The manufacturing method of the optical fiber transmission device of claim 8, further comprising:

using the fixing member to position the optical fiber assembly in the fixing member to adjust an inclination of the optical fiber assembly relative to a normal direction of the horizontal plane of the photonic integrated circuit.

10. The manufacturing method of the optical fiber transmission device of claim 9, further comprising:

forming an inclined inner side wall in the fixing member, so that after the optical fiber assembly is positioned in the fixing member, the extending direction of the optical fiber assembly is inclined relative to a central axis of the fixing member.

11. The manufacturing method of the optical fiber transmission device of claim 8, further comprising:

bonding the optical fiber assembly and the photonic integrated circuit by using an optical clear adhesive, wherein the optical clear adhesive has a light transmittance greater than 50%.

12. The manufacturing method of the optical fiber transmission device of claim 9, wherein the fixing member has a first sub-fixing member and a second sub-fixing member, and disposing the fixing member on the substrate comprises:

disposing the second sub-fixing member on the substrate; and supporting the first sub-fixing member by using the second sub-fixing member.

13. The manufacturing method of the optical fiber transmission device of claim 12, wherein disposing the second sub-fixing member on the substrate is performed such that a central axis of the second sub-fixing member is inclined relative to the normal direction of the horizontal plane of the photonic integrated circuit, and supporting the first sub-fixing member by using the second sub-fixing member is performed such that a central axis of the first sub-fixing member is inclined relative to the normal direction of the horizontal plane of the photonic integrated circuit.

14. The manufacturing method of the optical fiber transmission device of claim 12, wherein the fixing member further has a third sub-fixing member, and disposing the fixing member on the substrate further comprises:

engaging the first sub-fixing member and the second sub-fixing member by using the third sub-fixing member; and adjusting a horizontal position of the optical fiber assembly relative to the horizontal plane of the photonic integrated circuit.

15. A manufacturing method of an optical fiber transmission device, comprising:

forming a protruding structure on a substrate;

disposing a photonic integrated circuit on an area of the substrate, wherein the protruding structure is located at an interface between the substrate and an edge of the photonic integrated circuit;

positioning an optical fiber assembly in at least one fixing member, wherein the fixing member sleeves the optical fiber assembly, and the optical fiber assembly comprises an optical fiber and a ferrule that sleeves the optical fiber;

synchronously grinding the fixing member and one end of the optical fiber assembly that faces the photonic integrated circuit, so that each of the fixing member and the optical fiber assembly forms a ground end face, wherein the ground end face is parallel to a horizontal plane of the photonic integrated circuit;

optically aligning the optical fiber with the photonic integrated circuit; and disposing the fixing member on the substrate to configure the protruding structure of the substrate to abut against the ferrule to limit a position of the optical fiber assembly in a vertical direction of the substrate to serve as a stopper for the optical fiber assembly in the vertical direction, wherein the optical fiber assembly is optically coupled with the photonic integrated circuit in an extending direction of the optical fiber assembly, and the extending direction forms an acute angle with the horizontal plane of the photonic integrated circuit.

16. The manufacturing method of the optical fiber transmission device of claim 15, further comprising:

forming an inclined inner side wall in the fixing member, so that after the optical fiber assembly is positioned in the fixing member, the extending direction of the optical fiber assembly is inclined relative to a central axis of the fixing member.

17. The manufacturing method of the optical fiber transmission device of claim 15, further comprising:

after positioning the optical fiber assembly in the fixing member, inclining the fixing member relative to a normal direction of the horizontal plane of the photonic integrated circuit.

18. The manufacturing method of the optical fiber transmission device of claim 15, wherein the fixing member has a first sub-fixing member and a second sub-fixing member, and disposing the fixing member on the substrate comprises:

disposing the second sub-fixing member on the substrate; and supporting the first sub-fixing member by using the second sub-fixing member.

19. The manufacturing method of the optical fiber transmission device of claim 18, wherein disposing the second sub-fixing member on the substrate is performed such that a central axis of the second sub-fixing member is inclined relative to a normal direction of the horizontal plane of the photonic integrated circuit, and supporting the first sub-fixing member by using the second sub-fixing member is performed such that a central axis of the first sub-fixing member is inclined relative to the normal direction of the horizontal plane of the photonic integrated circuit.

* * * * *